United States Patent
Walters et al.

(10) Patent No.: US 11,562,252 B2
(45) Date of Patent: Jan. 24, 2023

(54) SYSTEMS AND METHODS FOR EXPANDING DATA CLASSIFICATION USING SYNTHETIC DATA GENERATION IN MACHINE LEARNING MODELS

(71) Applicant: Capital One Services, LLC, McLean, VA (US)

(72) Inventors: Austin Walters, Savoy, IL (US); Jeremy Goodsitt, Champaign, IL (US); Anh Truong, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 325 days.

(21) Appl. No.: 16/946,426

(22) Filed: Jun. 22, 2020

(65) Prior Publication Data
US 2021/0397972 A1 Dec. 23, 2021

(51) Int. Cl.
*G06N 3/08* (2006.01)
*G06N 3/04* (2006.01)

(52) U.S. Cl.
CPC ......... *G06N 3/088* (2013.01); *G06N 3/0454* (2013.01)

(58) Field of Classification Search
CPC .... G06N 3/088; G06N 3/0454; G06N 3/0445; G06N 3/0472; G06N 3/08; G06N 3/0427; G06N 5/003
See application file for complete search history.

(56) References Cited

U.S. PATENT DOCUMENTS 8,126,717 B1 2/2012 Strom
2020/0111019 A1* 4/2020 Goodsitt ............. G06N 3/0445

FOREIGN PATENT DOCUMENTS

EP 3591586 A1 * 1/2020 ........... G06N 3/0445

* cited by examiner

*Primary Examiner* — Yogeshkumar Patel
(74) *Attorney, Agent, or Firm* — Finnegan, Henderson, Farabow, Garrett & Dunner, LLP

(57) ABSTRACT

Systems and methods for classifying data are disclosed. For example, a system may include at least one memory storing instructions and at least one processor configured to execute the instructions to perform operations. The operations may include receiving training data comprising a class. The operations may include training a data classification model using the training data to generate a trained data classification model. The operations may include receiving additional data comprising labeled samples of an additional class not contained in the training data. The operations may include creating a synthetic data generator. The operations may include training the synthetic data generator to generate synthetic data corresponding to the additional class. The operations may include generating a synthetic classified dataset comprising the additional class. The operations may include retraining the trained data classification model using the synthetic classified dataset.

20 Claims, 22 Drawing Sheets

100

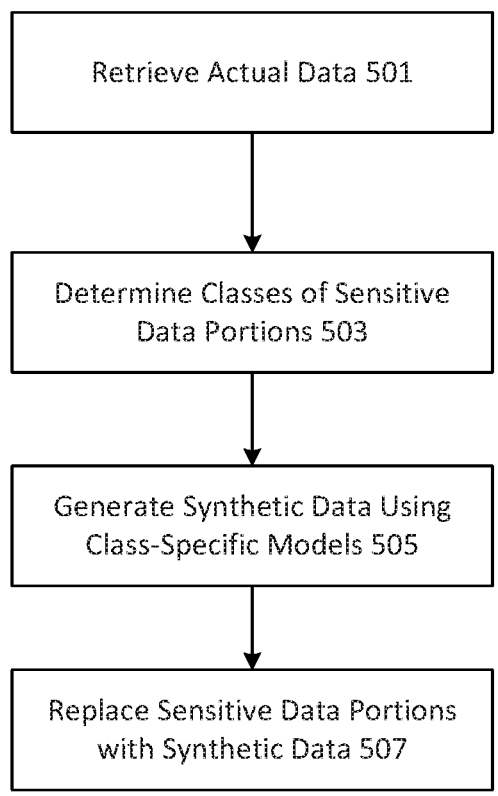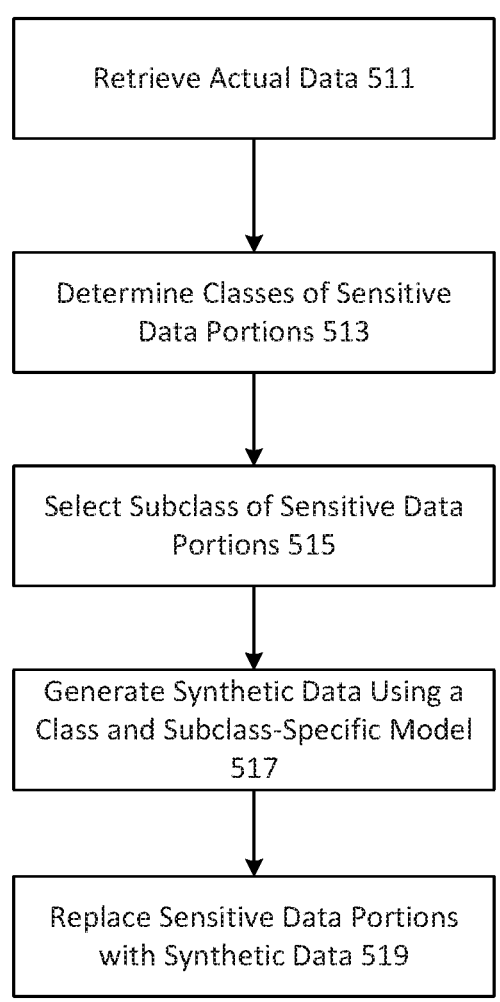
Fig. 5A
Fig. 5B

1700

Receive a Model Generation Request 1701

↓

Retrieve from a Model Storage a Stored Model and a Stored Hyperparameter Value 1703

↓

Provision Computing Resources with the Stored Model According to the Stored Hyperparameter Value 1705

↓

Provision the Computing Resources with the Stored Model According to a New Hyperparameter Value 1707

↓

Determine Satisfaction of a Termination Condition 1709

↓

Store the Second Trained Model and the New Hyperparameter Value in the Model Storage 1711

↓

Update the model index to include the second trained model and the new hyperparameter value 1713

↓

Provide the second trained model in response to the model generation request 1715

Fig. 17

SYSTEMS AND METHODS FOR EXPANDING DATA CLASSIFICATION USING SYNTHETIC DATA GENERATION IN MACHINE LEARNING MODELS

TECHNICAL FIELD

The disclosed embodiments concern systems and methods for management of machine learning models. In particular, the disclosed embodiments may concern using the disclosed systems and methods to generate synthetic data. In some embodiments, synthetic data may be used to train machine learning models. The disclosed embodiments may also involve using the disclosed systems and methods to automatically add additional class(es) to synthetic data to generate a synthetic classified dataset. A synthetic classified dataset may be used to retrain previously trained machine learning models. By automating the retraining of previously trained machine learning models, the disclosed systems and methods can allow for more rapid development of improved machine learning models. The disclosed systems and methods can also allow for more secure training of machine learning models when using sensitive data.

BACKGROUND

The need for efficient and effective systems to classify sensitive data arises in many fields, including finance, health care, government, and many other areas of human activity. Many of these fields involve collecting and analyzing large scale, complex sensitive datasets at high velocity (i.e., "big data."). Big data may involve sensitive datasets of such vast scale that classifying new data requires advanced application of analytic data science or knowledge processing (e.g., machine learning). Classification needs arise for all types of sensitive data including text data, numeric data, image data, video data, and the like.

Training machine learning models may require substantial amounts of training data. Furthermore, when used with data dissimilar from the training data, machine learning models may perform poorly. These characteristics may create problems for developers of machine learning applications designed to operate on sensitive data, such as, for example, customer financial records or patient healthcare data. Regulations governing the storage, transmission, and distribution of such data may inhibit application development, by forcing the development environment to comply with these burdensome regulations.

Furthermore, synthetic data may be generally useful for testing applications and systems. However, existing methods of creating synthetic data may be extremely slow and error-prone. For example, attempts to automatically desensitize data using regular expressions or similar methods requires substantial expertise and may fail when sensitive data is present in unanticipated formats or locations. Manual attempts to desensitize data may fall victim to human error. Neither approach will create synthetic data having statistical characteristics similar to those of the original data, limiting the utility of such data for training and testing purposes.

In addition, artificial intelligence systems designed to operate on sensitive data may not adapt quickly to new classes of data. Some conventional approaches may include retraining existing machine learning models with production data (e.g., data used in a production environment as opposed to synthetic data which may be used in a development environment). However, training data models with production data may expose sensitive data unnecessarily to people working in a development environment. In addition, regulatory constraints and/or privacy policies may limit use of sensitive data making training impossible with production data. Furthermore, retraining data models with production data each time a new class of data is added may expose sensitive data multiple times during training. Other conventional approaches may include adding new data models for the new classes of data. However, adding new data models may require considerable time to completely train new data models that are separate from previously trained data models.

Accordingly, given the shortcomings of conventional approaches, a need exists for systems and methods for expanding data classification in machine learning models.

SUMMARY

The disclosed embodiments provide unconventional systems and methods for expanding data classification in machine learning models. Embodiments consistent with the present disclosure are rooted in computer technology and may include implementing synthetic data generation to retrain a previously trained machine learning (or data) model. Use of synthetic data generation may reduce transmission of sensitive data. Use of synthetic data generation may lead to improved efficiency of expanding previously trained machine learning models. When production data is provided by multiple parties, use of synthetic data generation may enable each party to maintain security of sensitive data.

Consistent with the present embodiments, a system for classifying data is disclosed. The system may include at least one memory storing instructions and at least one processor configured to execute the instructions to perform operations. The operations may include receiving training data. The operations may include training a data classification model using the training data to generate a trained data classification model. The trained data classification model may be configured to identify a class. The operations may include training a synthetic data generator (i.e., a synthetic data model) to generate synthetic data corresponding to the class. The operations may include receiving additional data comprising labeled samples of an additional class. The additional class may not be contained in the training data. The operations may include creating a synthetic data generator. The operations may include training the synthetic data generator to generate synthetic data corresponding to the additional class. The operations may include generating a synthetic classified dataset comprising the additional class. The operations may include retraining the trained data classification model using the synthetic classified dataset to generate a retrained data classification model. The retrained data classification model may be configured to identify the additional class. The operations may include receiving, at a server, from a client device, unclassified production data. The operations may include generating classified production data by using the retrained data classification model to classify the unclassified production data. The classified production data may comprise the additional class. The operations may include communicating, to the client device, the classified production data.

Consistent with the present embodiments, a method for classifying data is disclosed. The method may include receiving training data. The method may include training a data classification model using the training data to generate a trained data classification model. The trained data classification model may be configured to identify a class. The method may include training a synthetic data generator to generate synthetic data corresponding to the class. The method may include receiving additional data comprising labeled samples of an additional class. The additional class may not be contained in the training data. The method may include creating a synthetic data generator. The method may include training the synthetic data generator to generate synthetic data corresponding to the additional class. The method may include generating a synthetic classified dataset comprising the additional class. The method may include retraining the trained data classification model using the synthetic classified dataset to generate a retrained data classification model. The retrained data classification model may be configured to identify the additional class.

Consistent with other disclosed embodiments, a trained data classification model may be retrained using one or more libraries comprising data formatting instructions.

Consistent with other disclosed embodiments, a trained data classification model may be retrained using one or more functions configured to combine label data with background data.

Consistent with other disclosed embodiments, a trained data classification model may be retrained using an organizational model trained to organize the additional data.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as one or more machines constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5A depicts an exemplary process for generating synthetic data using class-specific models, consistent with disclosed embodiments.

FIG. 5B depicts an exemplary process for generating synthetic data using class and subclass-specific models, consistent with disclosed embodiments.

FIG. 17 depicts an exemplary process for hyperparameter tuning, consistent with disclosed embodiments.

DESCRIPTION OF THE EMBODIMENTS

Figure 1:
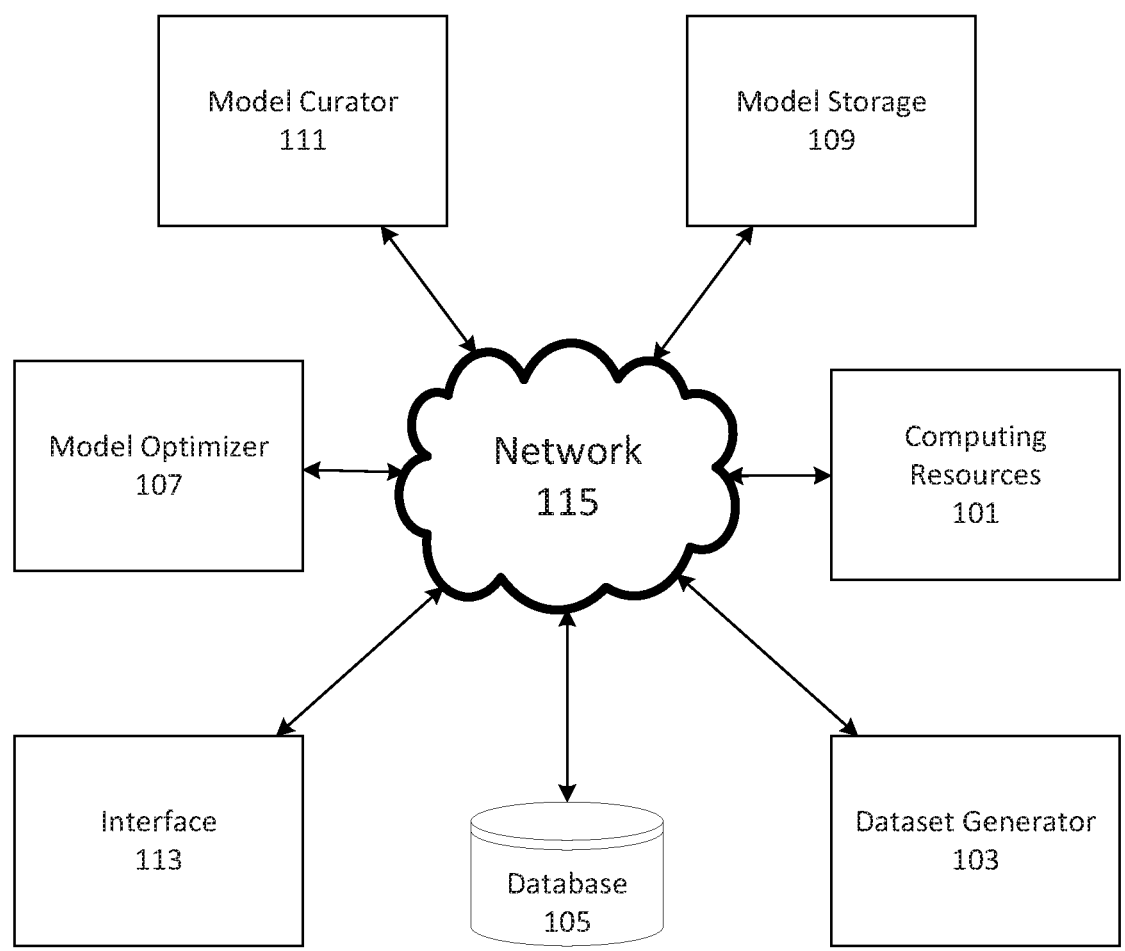
FIG. 1 depicts an exemplary cloud-computing environment for generating data models, consistent with disclosed embodiments.

Consistent with disclosed embodiments, systems and methods to classify data are disclosed. Embodiments consistent with the present disclosure may include implementing synthetic data generation to retrain a previously trained machine learning (or data) model. As explained above, disclosed systems and methods provide efficiency and reduction of sensitive data exposure over conventional approaches to expanding machine learning models.

Embodiments consistent with the present disclosure may include data (i.e., datasets). Datasets may comprise actual data reflecting real-world conditions, events, and/or measurements. In some embodiments, disclosed systems and methods may fully or partially involve synthetic data (e.g., anonymized actual data or fake data). Datasets may involve time series data, numeric data, text data, and/or image data. Datasets may involve sensitive data. For example, datasets may include transaction data, financial data, personal data, government data, private data, and/or other data.

Datasets may have a plurality of dimensions, the dimensions corresponding to variables. For example, a dataset may include a time series of 3-dimensional spatial data. Datasets of the embodiments may have any number of dimensions. As an illustrative example, datasets of the embodiments may include time series data with dimensions corresponding to longitude, latitude, cancer incidence, population density, air quality, and water quality. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e., data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 depicts a cloud-computing environment 100 for generating data models. Environment 100 may be configured to support generation and storage of synthetic data, generation and storage of data models, optimized choice of parameters for machine learning, and imposition of rules on synthetic data and data models. Environment 100 may be configured to expose an interface for communication with other systems. Environment 100 may include computing resources 101, dataset generator 103, database 105, model optimizer 107, model storage 109, model curator 111, and interface 113. These components of environment 100 may be configured to communicate with each other, or with external components of environment 100, using network 115. The particular arrangement of components depicted in FIG. 1 is not intended to be limiting. System 100 may include additional components, or fewer components. Multiple components of system 100 may be implemented using the same physical computing device or different physical computing devices.

Computing resources 101 may include one or more computing devices configurable to train data models. The computing devices may be special-purpose computing devices, such as graphical processing units (GPUs) or application-specific integrated circuits. The cloud computing instances may be general-purpose computing devices. The computing devices may be configured to host an environment for training data models. For example, the computing devices may host virtual machines, pods, or containers. The computing devices may be configured to run applications for generating data models. For example, the computing devices may be configured to run SAGEMAKER, GENESYS, or similar machine learning training applications. Computing resources 101 may be configured to receive models for training from model optimizer 107, model storage 109, or another component of system 100. Computing resources 101 may be configured provide training results, including trained models and model information, such as the type and/or purpose of the model and any measures of classification error.

Dataset generator 103 may include one or more computing devices configured to generate data. Dataset generator 103 may be configured to provide data to computing resources 101, database 105, to another component of system 100 (e.g., interface 113), or another system (e.g., an APACHE KAFKA cluster or other publication service). Dataset generator 103 may be configured to receive data from database 105 or another component of system 100. Dataset generator 103 may be configured to receive data models from model storage 109 or another component of system 100. Dataset generator 103 may be configured to generate synthetic data. For example, dataset generator 103 may be configured to generate synthetic data by identifying and replacing sensitive information in data received from database 105 or interface 113. As an additional example, dataset generator 103 may be configured to generate synthetic data using a data model without reliance on input data. For example, the data model may be configured to generate data matching statistical and content characteristics of a training dataset. In some aspects, the data model may be configured to map from a random or pseudorandom vector to elements in the training data space.

Database 105 may include one or more databases configured to store data for use by system 100. The databases may include cloud-based databases (e.g., AMAZON WEB SERVICES S3 buckets) or on-premises databases.

Model optimizer 107 may include one or more computing systems configured to manage training of data models for system 100. Model optimizer 107 may be configured to generate models for export to computing resources 101. Model optimizer 107 may be configured to generate models based on instructions received from a user or another system. These instructions may be received through interface 113. For example, model optimizer 107 may be configured to receive a graphical depiction of a machine learning model and parse that graphical depiction into instructions for creating and training a corresponding neural network on computing resources 101. Model optimizer 107 may be configured to select model training parameters. This selection may be based on model performance feedback received from computing resources 101. Model optimizer 107 may be configured to provide trained models and descriptive information concerning the trained models to model storage 109.

Model storage 109 may include one or more databases configured to store data models and descriptive information for the data models. Model storage 109 may be configured to provide information regarding available data models to a user or another system. This information may be provided using interface 113. The databases may include cloud-based databases (e.g., AMAZON WEB SERVICES S3 buckets) or on-premises databases. The information may include model information, such as the type and/or purpose of the model and any measures of classification error.

Model curator 111 may be configured to impose governance criteria on the use of data models. For example, model curator 111 may be configured to delete or control access to models that fail to meet accuracy criteria. As a further example, model curator 111 may be configured to limit the use of a model to a particular purpose, or by a particular entity or individual. In some aspects, model curator 11 may be configured to ensure that data model satisfies governance criteria before system 100 may process data using the data model.

Interface 113 may be configured to manage interactions between system 100 and other systems using network 115. In some aspects, interface 113 may be configured to publish data received from other components of system 100 (e.g., dataset generator 103, computing resources 101, database 105, or the like). This data may be published in a publication and subscription framework (e.g., using APACHE KAFKA), through a network socket, in response to queries from other systems, or using other known methods. The data may be synthetic data, as described herein. As an additional example, interface 113 may be configured to provide information received from model storage 109 regarding available datasets. In various aspects, interface 113 may be configured to provide data or instructions received from other systems to components of system 100. For example, interface 113 may be configured to receive instructions for generating data models (e.g., type of data model, data model parameters, training data indicators, training parameters, or the like) from another system and provide this information to model optimizer 107. As an additional example, interface 113 may be configured to receive data including sensitive portions from another system (e.g., in a file, a message in a publication and subscription framework, a network socket, or the like) and provide that data to dataset generator 103 or database 105.

Network 115 may include any combination of electronics communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network known to one of skill in the art.

Figure 2:
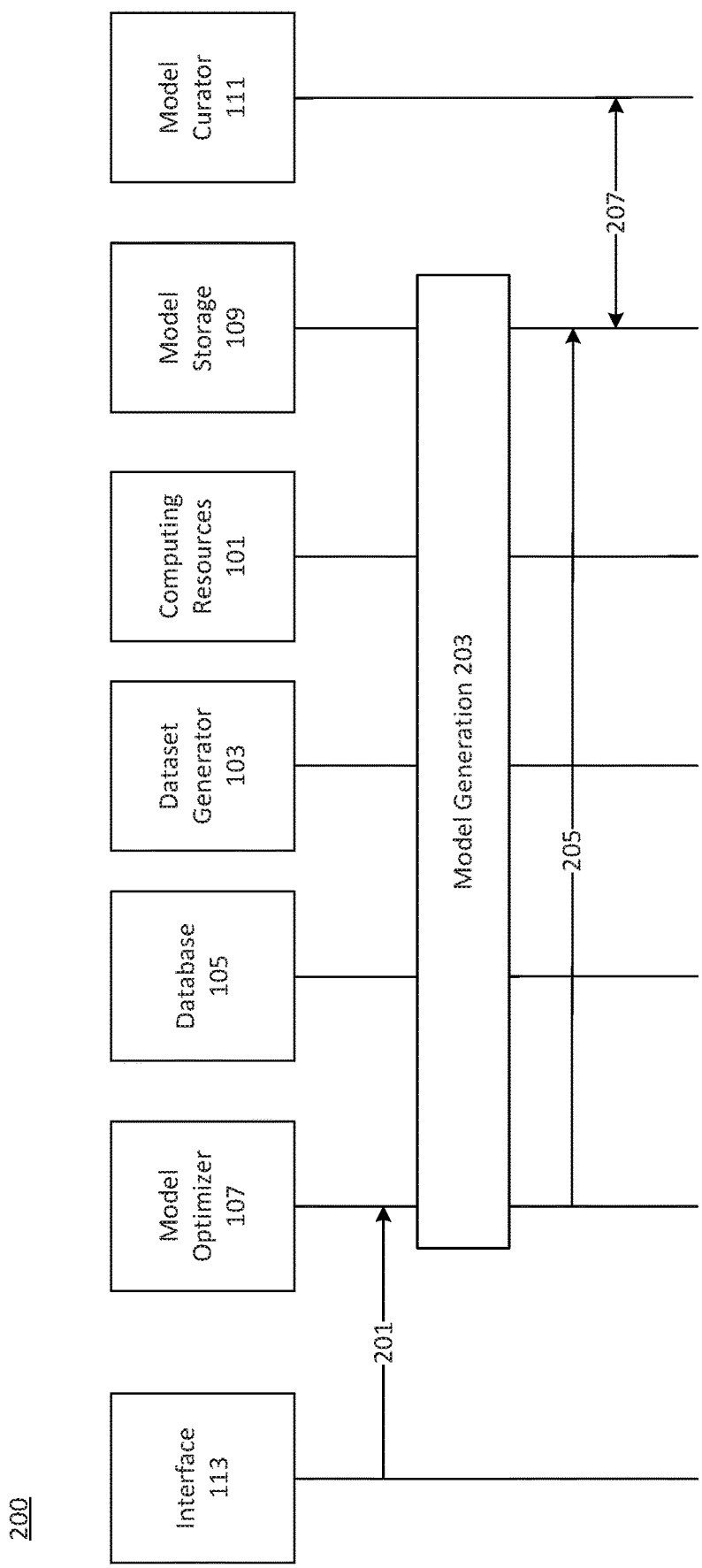
FIG. 2 depicts an exemplary process for generating data models, consistent with disclosed embodiments.

FIG. 2 depicts a process 200 for generating data models. Process 200 may be used to generate a data model for a machine learning application, consistent with disclosed embodiments. The data model may be generated using synthetic data in some aspects. This synthetic data may be generated using a synthetic dataset model, which may in turn be generated using actual data. The synthetic data may be similar to the actual data in terms of values, value distributions (e.g., univariate and multivariate statistics of the synthetic data may be similar to that of the actual data), structure and ordering, or the like. In this manner, the data model for the machine learning application may be generated without directly using the actual data. As the actual data may include sensitive information, and generating the data model may require distribution and/or review of training data, the use of the synthetic data may protect the privacy and security of the entities and/or individuals whose activities are recorded by the actual data.

Process 200 may then proceed to step 201. In step 201, interface 113 may provide a data model generation request to model optimizer 107. The data model generation request may include data and/or instructions describing the type of data model to be generated. For example, the data model generation request may specify a general type of data model (e.g., neural network, recurrent neural network, generative adversarial network, kernel density estimator, random data generator, or the like) and parameters specific to the particular type of model (e.g., the number of features and number of layers in a generative adversarial network or recurrent neural network). In some embodiments, a recurrent neural network may include long short term memory modules (LSTM units), or the like.

Process 200 may then proceed to step 203. In step 203, one or more components of system 100 may interoperate to generate a data model. For example, as described in greater detail with regard to FIG. 3, a data model may be trained using computing resources 101 using data provided by dataset generator 103. In some aspects, this data may be generated using dataset generator 103 from data stored in database 105. In various aspects, the data used to train dataset generator 103 may be actual or synthetic data retrieved from database 105. This training may be supervised by model optimizer 107, which may be configured to select model parameters (e.g., number of layers for a neural network, kernel function for a kernel density estimator, or the like), update training parameters, and evaluate model characteristics (e.g., the similarity of the synthetic data generated by the model to the actual data). In some embodiments, model optimizer 107 may be configured to provision computing resources 101 with an initialized data model for training. The initialized data model may be, or may be based upon, a model retrieved from model storage 109.

Process 200 may then proceed to step 205. In step 205, model optimizer 107 may evaluate the performance of the trained synthetic data model. When the performance of the trained synthetic data model satisfies performance criteria, model optimizer 107 may be configured to store the trained synthetic data model in model storage 109. For example, model optimizer 107 may be configured to determine one or more values for similarity and/or predictive accuracy metrics, as described herein. In some embodiments, based on values for similarity metrics, model optimizer 107 may be configured to assign a category to the synthetic data model.

According to a first category, a synthetic data model generates output data (i.e., synthetic data) maintaining a moderate level of correlation or similarity with original data elements, matches well with an original schema, and generates output data with less than a predetermined proportion of duplicate elements. According to a second category, the synthetic data model may generate output data maintaining a high level of correlation or similarity of the original data, and therefore could potentially cause the original data to be discernable from the original data (e.g., a data leak). A synthetic data model generating output data with a synthetic data schema failing to match the original schema with the original data or providing many duplicated elements may also be placed in this category. According to a third category, the synthetic data model may likely generate output data maintaining a high level of correlation or similarity with the original data, likely allowing a data leak. A synthetic data model generating output data with a synthetic data schema badly failing to match the original schema with the original data or providing far too many duplicated elements may also be placed in this category.

In some embodiments, system 100 may be configured to provide instructions for improving the quality of the synthetic data model. If a user requires synthetic data reflecting less correlation or similarity with the original data, the use may change the models' parameters to make them perform worse (e.g., by decreasing number of layers in generative adversarial network (GAN) models, or reducing the number of training iterations). If the users want the synthetic data to have better quality, they may change the models' parameters to make them perform better (e.g., by increasing number of layers in GAN models, or increasing the number of training iterations).

Process 200 may then proceed to step 207, in step 207, model curator 111 may evaluate the trained synthetic data model for compliance with governance criteria.

Figure 3:
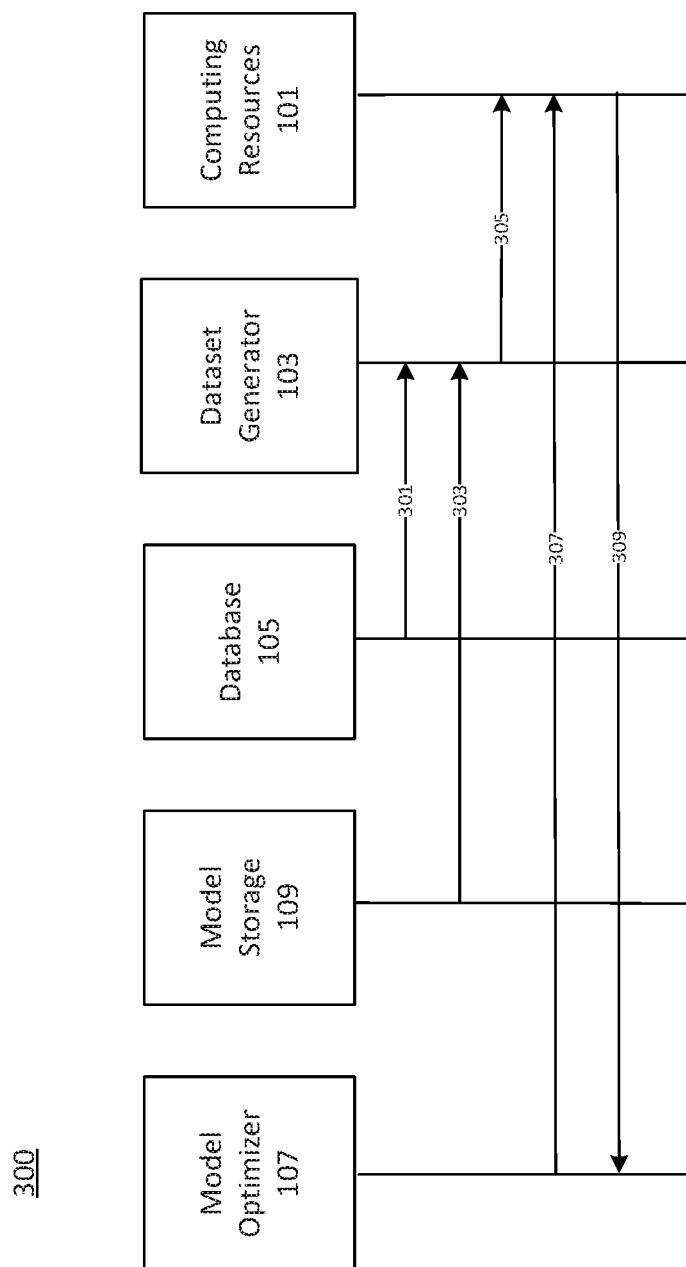
FIG. 3 depicts an exemplary process for generating synthetic data using existing data models, consistent with disclosed embodiments.

FIG. 3 depicts a process 300 for generating a data model using an existing synthetic data model, consistent with disclosed embodiments. Process 300 may include the steps of retrieving a synthetic dataset model from model storage 109, retrieving data from database 105, providing synthetic data to computing resources 101, providing an initialized data model to computing resources 101, and providing a trained data model to model optimizer 107. In this manner, process 300 may allow system 100 to generate a model using synthetic data.

Process 300 may then proceed to step 301. In step 301, dataset generator 103 may retrieve a training dataset from database 105. The training dataset may include actual training data, in some aspects. The training dataset may include synthetic training data, in some aspects. In some embodiments, dataset generator 103 may be configured to generate synthetic data from sample values. For example, dataset generator 103 may be configured to use the generative network of a generative adversarial network to generate data samples from random-valued vectors. In such embodiments, process 300 may forgo step 301.

Process 300 may then proceed to step 303. In step 303, dataset generator 103 may be configured to receive a synthetic data model from model storage 109. In some embodiments, model storage 109 may be configured to provide the synthetic data model to dataset generator 103 in response to a request from dataset generator 103. In various embodiments, model storage 109 may be configured to provide the synthetic data model to dataset generator 103 in response to a request from model optimizer 107, or another component of system 100. As a non-limiting example, the synthetic data model may be a neural network, recurrent neural network (which may include LSTM units), generative adversarial network, kernel density estimator, random value generator, or the like.

Process 300 may then proceed to step 305. In step 305, in some embodiments, dataset generator 103 may generate synthetic data. Dataset generator 103 may be configured, in some embodiments, to identify sensitive data items (e.g., account numbers, social security numbers, names, addresses, API keys, network or IP addresses, or the like) in the data received from model storage 109. In some embodiments, dataset generator 103 may be configured to identify sensitive data items using a recurrent neural network. Dataset generator 103 may be configured to use the data model retrieved from model storage 109 to generate a synthetic dataset by replacing the sensitive data items with synthetic data items.

Dataset generator 103 may be configured to provide the synthetic dataset to computing resources 101. In some embodiments, dataset generator 103 may be configured to provide the synthetic dataset to computing resources 101 in response to a request from computing resources 101, model optimizer 107, or another component of system 100. In various embodiments, dataset generator 103 may be configured to provide the synthetic dataset to database 105 for storage. In such embodiments, computing resources 101 may be configured to subsequently retrieve the synthetic dataset from database 105 directly, or indirectly through model optimizer 107 or dataset generator 103.

Process 300 may then proceed to step 307. In step 307, computing resources 101 may be configured to receive a data model from model optimizer 107, consistent with disclosed embodiments. In some embodiments, the data model may be at least partially initialized by model optimizer 107. For example, at least some of the initial weights and offsets of a neural network model received by computing resources 101 in step 307 may be set by model optimizer 107. In various embodiments, computing resources 101 may be configured to receive at least some training parameters from model optimizer 107 (e.g., batch size, number of training batches, number of epochs, chunk size, time window, input noise dimension, or the like).

Process 300 may then proceed to step 309. In step 309, computing resources 101 may generate a trained data model using the data model received from model optimizer 107 and the synthetic dataset received from dataset generator 103. For example, computing resources 101 may be configured to train the data model received from model optimizer 107 until some training criterion is satisfied. The training criterion may be, for example, a performance criterion (e.g., a Mean Absolute Error, Root Mean Squared Error, percent good classification, and the like), a convergence criterion (e.g., a minimum required improvement of a performance criterion over iterations or over time, a minimum required change in model parameters over iterations or over time), elapsed time or number of iterations, or the like. In some embodiments, the performance criterion may be a threshold value for a similarity metric or prediction accuracy metric as described herein. Satisfaction of the training criterion may be determined by one or more of computing resources 101 and model optimizer 107. In some embodiments, computing resources 101 may be configured to update model optimizer 107 regarding the training status of the data model. For example, computing resources 101 may be configured to provide the current parameters of the data model and/or current performance criteria of the data model. In some embodiments, model optimizer 107 may be configured to stop the training of the data model by computing resources 101. In various embodiments, model optimizer 107 may be configured to retrieve the data model from computing resources 101. In some embodiments, computing resources 101 may be configured to stop training the data model and provide the trained data model to model optimizer 107.

Figure 4:
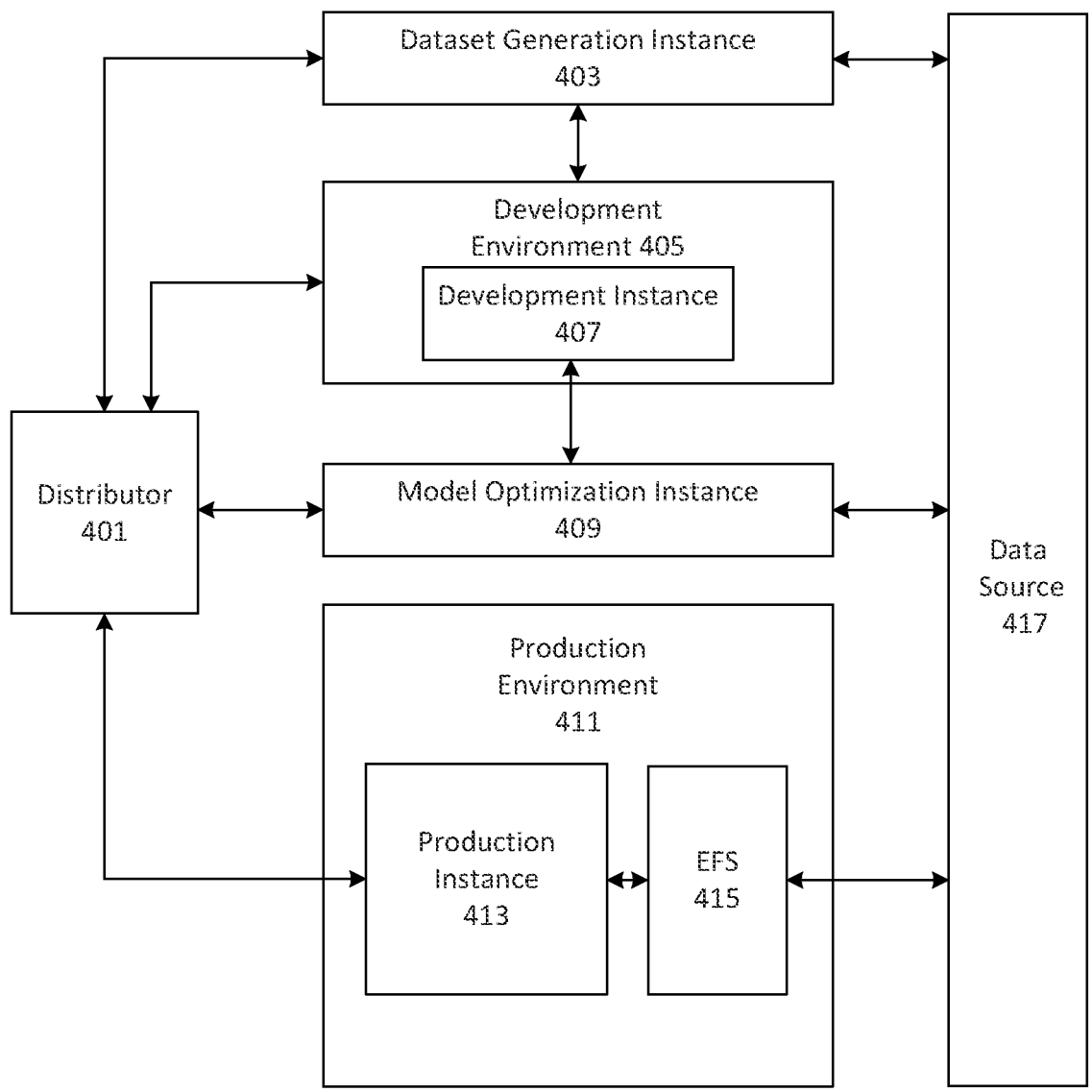
FIG. 4 depicts an exemplary implementation of the cloud-computing environment of FIG. 1, consistent with disclosed embodiments.

FIG. 4 depicts a specific implementation (system 400) of system 100 of FIG. 1. As shown in FIG. 4, the functionality of system 100 may be divided between a distributor 401, a dataset generation instance 403, a development environment 405, a model optimization instance 409, and a production environment 411. In this manner, system 100 may be implemented in a stable and scalable fashion using a distributed computing environment, such as a public cloud-computing environment, a private cloud computing environment, a hybrid cloud computing environment, a computing cluster or grid, or the like. As present computing requirements increase for a component of system 400 (e.g., as production environment 411 is called upon to instantiate additional production instances to address requests for additional synthetic data streams), additional physical or virtual machines may be recruited to that component. In some embodiments, dataset generator 103 and model optimizer 107 may be hosted by separate virtual computing instances of the cloud computing system.

Distributor 401 may be configured to provide, consistent with disclosed embodiments, an interface between the components of system 400, and between the components of system 400 and other systems. In some embodiments, distributor 401 may be configured to implement interface 113 and a load balancer. Distributor 401 may be configured to route messages between computing resources 101 (e.g., implemented on one or more of development environment 405 and production environment 411), dataset generator 103 (e.g., implemented on dataset generator instance 403), and model optimizer 107 (e.g., implemented on model optimization instance 409). The messages may include data and instructions. For example, the messages may include model generation requests and trained models provided in response to model generation requests. As an additional example, the messages may include synthetic data sets or synthetic data streams. Consistent with disclosed embodiments, distributor 401 may be implemented using one or more EC2 clusters or the like.

Data generation instance 403 may be configured to generate synthetic data, consistent with disclosed embodiments. In some embodiments, data generation instance 403 may be configured to receive actual or synthetic data from data source 417. In various embodiments, data generation instance 403 may be configured to receive synthetic data models for generating the synthetic data. In some aspects, the synthetic data models may be received from another component of system 400, such as data source 417.

Development environment 405 may be configured to implement at least a portion of the functionality of computing resources 101, consistent with disclosed embodiments. For example, development environment 405 may be configured to train data models for subsequent use by other components of system 400. In some aspects, development instances (e.g., development instance 407) hosted by development environment 405 may train one or more individual data models. In some aspects, development environment 405 be configured to spin up additional development instances to train additional data models, as needed. In some aspects, a development instance may implement an application framework such as TENSORBOARD, JUPYTER and the like; as well as machine learning applications like TENSORFLOW, CUDNN, KERAS, and the like. Consistent with disclosed embodiments, these application frameworks and applications may enable the specification and training of data models. In various aspects, development environment 405 may be implemented using one or more EC2 clusters or the like.

Model optimization instance 409 may be configured to manage training and provision of data models by system 400. In some aspects, model optimization instance 409 may be configured to provide the functionality of model optimizer 107. For example, model optimization instance 409 may be configured to provide training parameters and at least partially initialized data models to development environment 405. This selection may be based on model performance feedback received from development environment 405. As an additional example, model optimization instance 409 may be configured to determine whether a data model satisfies performance criteria. In some aspects, model optimization instance 409 may be configured to provide trained models and descriptive information concerning the trained models to another component of system 400. In various aspects, model optimization instance 409 may be implemented using one or more EC2 clusters or the like.

Production environment 405 may be configured to implement at least a portion of the functionality of computing resources 101, consistent with disclosed embodiments. For example, production environment 405 may be configured to use previously trained data models to process data received by system 400. In some aspects, a production instance (e.g., production instance 413) hosted by development environment 411 may be configured to process data using a previously trained data model. In some aspects, the production instance may implement an application framework such as TENSORBOARD, JUPYTER and the like; as well as machine learning applications like TENSORFLOW, CUDNN, KERAS, and the like. Consistent with disclosed embodiments, these application frameworks and applications may enable processing of data using data models. In various aspects, development environment 405 may be implemented using one or more EC2 clusters or the like.

A component of system 400 (e.g., model optimization instance 409) may determine the data model and data source for a production instance according to the purpose of the data processing. For example, system 400 may configure a production instance to produce synthetic data for consumption by other systems. In this example, the production instance may then provide synthetic data for testing another application. As a further example, system 400 may configure a production instance to generate outputs using actual data. For example, system 400 may configure a production instance with a data model for detecting fraudulent transactions. The production instance may then receive a stream of financial transaction data and identify potentially fraudulent transactions. In some aspects, this data model may have been trained by system 400 using synthetic data created to resemble the stream of financial transaction data. System 400 may be configured to provide an indication of the potentially fraudulent transactions to another system configured to take appropriate action (e.g., reversing the transaction, contacting one or more of the parties to the transaction, or the like).

Production environment 411 may be configured to host a file system 415 for interfacing between one or more production instances and data source 417. For example, data source 417 may be configured to store data in file system 415, while the one or more production instances may be configured to retrieve the stored data from file system 415 for processing. In some embodiments, file system 415 may be configured to scale as needed. In various embodiments, file system 415 may be configured to support parallel access by data source 417 and the one or more production instances. For example, file system 415 may be an instance of AMAZON ELASTIC FILE SYSTEM (EFS) or the like.

Data source 417 may be configured to provide data to other components of system 400. In some embodiments, data source 417 may include sources of actual data, such as streams of transaction data, human resources data, web log data, web security data, web protocols data, or system logs data. System 400 may also be configured to implement model storage 109 using a database (not shown) accessible to at least one other component of system 400 (e.g., distributor 401, dataset generation instance 403, development environment 405, model optimization instance 409, or production environment 411). In some aspects, the database may be an s3 bucket, relational database, or the like.

FIG. 5A depicts process 500 for generating synthetic data using class-specific models, consistent with disclosed embodiments. System 100, or a similar system, may be configured to use such synthetic data in training a data model for use in another application (e.g., a fraud detection application). Process 500 may include the steps of retrieving actual data, determining classes of sensitive portions of the data, generating synthetic data using a data model for the appropriate class, and replacing the sensitive data portions with the synthetic data portions. In some embodiments, the data model may be a generative adversarial network trained to generate synthetic data satisfying a similarity criterion, as described herein. By using class-specific models, process 500 may generate better synthetic data that more accurately models the underlying actual data than randomly generated training data that lacks the latent structures present in the actual data. Because the synthetic data more accurately models the underlying actual data, a data model trained using this improved synthetic data may perform better processing the actual data.

Process 500 may then proceed to step 501. In step 501, dataset generator 103 may be configured to retrieve actual data. As a non-limiting example, the actual data may have been gathered during the course of ordinary business operations, marketing operations, research operations, or the like. Dataset generator 103 may be configured to retrieve the actual data from database 105 or from another system. The actual data may have been purchased in whole or in part by an entity associated with system 100. As would be understood from this description, the source and composition of the actual data is not intended to be limiting.

Process 500 may then proceed to step 503. In step 503, dataset generator 103 may be configured to determine classes of the sensitive portions of the actual data. As a non-limiting example, when the actual data is account transaction data, classes could include account numbers and merchant names. As an additional non-limiting example, when the actual data is personnel records, classes could include employee identification numbers, employee names, employee addresses, contact information, marital or beneficiary information, title and salary information, and employment actions. Consistent with disclosed embodiments, dataset generator 103 may be configured with a classifier for distinguishing different classes of sensitive information. In some embodiments, dataset generator 103 may be configured with a recurrent neural network for distinguishing different classes of sensitive information. Dataset generator 103 may be configured to apply the classifier to the actual data to determine that a sensitive portion of the training dataset belongs to the data class. For example, when the data stream includes the text string "Lorem ipsum 012-34-5678 dolor sit amet," the classifier may be configured to indicate that positions 13-23 of the text string include a potential social security number. Though described with reference to character string substitutions, the disclosed systems and methods are not so limited. As a non-limiting example, the actual data may include unstructured data (e.g., character strings, tokens, and the like) and structured data (e.g., key-value pairs, relational database files, spreadsheets, and the like).

Process 500 may then proceed to step 505. In step 505, dataset generator 103 may be configured to generate a synthetic portion using a class-specific model. To continue the previous example, dataset generator 103 may generate a synthetic social security number using a synthetic data model trained to generate social security numbers. In some embodiments, this class-specific synthetic data model may be trained to generate synthetic portions similar to those appearing in the actual data. For example, as social security numbers include an area number indicating geographic information and a group number indicating date-dependent information, the range of social security numbers present in an actual dataset may depend on the geographic origin and purpose of that dataset. A dataset of social security numbers for elementary school children in a particular school district may exhibit different characteristics than a dataset of social security numbers for employees of a national corporation. To continue the previous example, the social security-specific synthetic data model could generate the synthetic portion "013-74-3285."

Process 500 may then proceed to step 507. In step 507, dataset generator 103 may be configured to replace the sensitive portion of the actual data with the synthetic portion. To continue the previous example, dataset generator 103 could be configured to replace the characters at positions 13-23 of the text string with the values "013-74-3285," creating the synthetic text string "Lorem ipsum 013-74-3285 dolor sit amet." This text string may now be distributed without disclosing the sensitive information originally present. But this text string may still be used to train models that make valid inferences regarding the actual data, because synthetic social security numbers generated by the synthetic data model share the statistical characteristic of the actual data.

FIG. 5B depicts a process 510 for generating synthetic data using class and subclass-specific models, consistent with disclosed embodiments. Process 510 may include the steps of retrieving actual data, determining classes of sensitive portions of the data, selecting types for synthetic data used to replace the sensitive portions of the actual data, generating synthetic data using a data model for the appropriate type and class, and replacing the sensitive data portions with the synthetic data portions. In some embodiments, the data model may be a generative adversarial network trained to generate synthetic data satisfying a similarity criterion, as described herein. This improvement addresses a problem with synthetic data generation, that a synthetic data model may fail to generate examples of proportionately rare data subclasses. For example, when data may be classified into two distinct subclasses, with a second subclass far less prevalent in the data than a first subclass, a model of the synthetic data may generate only examples of the most common first data subclasses. The synthetic data model effectively focuses on generating the best examples of the most common data subclasses, rather than acceptable examples of all the data subclasses. Process 510 addresses this problem by expressly selecting subclasses of the synthetic data class according to a distribution model based on the actual data.

Process 510 may then proceed through step 511 and step 513, which resemble step 501 and step 503 in process 500. In step 511, dataset generator 103 may be configured to receive actual data. In step 513, dataset generator may be configured to determine classes of sensitive portions of the actual data. In a non-limiting example, dataset generator 103 may be configured to determine that a sensitive portion of the data may contain a financial service account number. Dataset generator 103 may be configured to identify this sensitive portion of the data as a financial service account number using a classifier, which may in some embodiments be a recurrent neural network (which may include LSTM units).

Process 510 may then proceed to step 515. In step 515, dataset generator 103 may be configured to select a subclass for generating the synthetic data. In some aspects, this selection is not governed by the subclass of the identified sensitive portion. For example, in some embodiments the classifier that identifies the class need not be sufficiently discerning to identify the subclass, relaxing the requirements on the classifier. Instead, this selection is based on a distribution model. For example, dataset generator 103 may be configured with a statistical distribution of subclasses (e.g., a univariate distribution of subclasses) for that class and may select one of the subclasses for generating the synthetic data according to the statistical distribution. To continue the previous example, individual accounts and trust accounts may both be financial service account numbers, but the values of these accounts numbers may differ between individual accounts and trust accounts. Furthermore, there may be 19 individual accounts for every 1 trust account. In this example, dataset generator 103 may be configured to select the trust account subclass 1 time in 20, and use a synthetic data model for financial service account numbers for trust accounts to generate the synthetic data. As a further example, dataset generator 103 may be configured with a recurrent neural network that estimates the next subclass based on the current and previous subclasses. For example, healthcare records may include cancer diagnosis stage as sensitive data. Most cancer diagnosis stage values may be "no cancer" and the value of "stage 1" may be rare, but when present in a patient record this value may be followed by "stage 2," etc. The recurrent neural network may be trained on the actual healthcare records to use prior and cancer diagnosis stage values when selecting the subclass. For example, when generating a synthetic healthcare record, the recurrent neural network may be configured to use the previously selected cancer diagnosis stage subclass in selecting the present cancer diagnosis stage subclass. In this manner, the synthetic healthcare record may exhibit an appropriate progression of patient health that matches the progression in the actual data.

Process 510 may then proceed to step 517. In step 517, which resembles step 505, dataset generator 103 may be configured to generate synthetic data using a class and subclass specific model. To continue the previous financial service account number example, dataset generator 103 may be configured to use a synthetic data for trust account financial service account numbers to generate the synthetic financial server account number.

Process 510 may then proceed to step 519. In step 519, which resembles step 507, dataset generator 103 may be configured to replace the sensitive portion of the actual data with the generated synthetic data. For example, dataset generator 103 may be configured to replace the financial service account number in the actual data with the synthetic trust account financial service account number.

Figure 6:
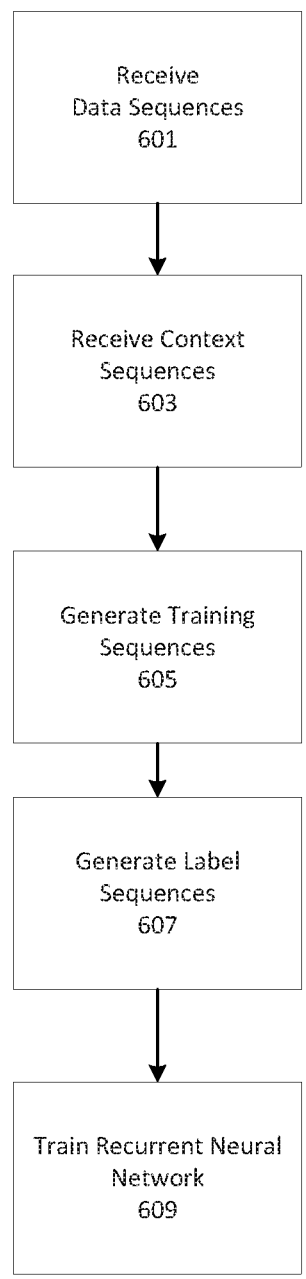
FIG. 6 depicts an exemplary process for training a classifier for generation of synthetic data, consistent with disclosed embodiments.

FIG. 6 depicts a process 600 for training a classifier for generation of synthetic data. In some embodiments, such a classifier could be used by dataset generator 103 to classify sensitive data portions of actual data, as described above with regards to FIGS. 5A and 5B. Process 600 may include the steps of receiving data sequences, receiving content sequences, generating training sequences, generating label sequences, and training a classifier using the training sequences and the label sequences. By using known data sequences and content sequences unlikely to contain sensitive data, process 600 may be used to automatically generate a corpus of labeled training data. Process 600 may be performed by a component of system 100, such as dataset generator 103 or model optimizer 107.

Process 600 may then proceed to step 601. In step 601, system 100 may receive training data sequences. The training data sequences may be received from a dataset. The dataset providing the training data sequences may be a component of system 100 (e.g., database 105) or a component of another system. The data sequences may include multiple classes of sensitive data. As a non-limiting example, the data sequences may include account numbers, social security numbers, and full names.

Process 600 may then proceed to step 603. In step 603, system 100 may receive context sequences. The context sequences may be received from a dataset. The dataset providing the context sequences may be a component of system 100 (e.g., database 105) or a component of another system. In various embodiments, the context sequences may be drawn from a corpus of pre-existing data, such as an open-source text dataset (e.g., Yelp Open Dataset or the like). In some aspects, the context sequences may be snippets of this pre-existing data, such as a sentence or paragraph of the pre-existing data.

Process 600 may then proceed to step 605. In step 605, system 100 may generate training sequences. In some embodiments, system 100 may be configured to generate a training sequence by inserting a data sequence into a context sequence. The data sequence may be inserted into the context sequence without replacement of elements of the context sequence or with replacement of elements of the context sequence. The data sequence may be inserted into the context sequence between elements (e.g., at a whitespace character, tab, semicolon, html closing tag, or other semantic breakpoint) or without regard to the semantics of the context sequence. For example, when the context sequence is "Lorem ipsum dolor sit amet, consectetur adipiscing elit, sed do eiusmod" and the data sequence is "013-74-3285," the training sequence may be "Lorem ipsum dolor sit amet, 013-74-3285 consectetur adipiscing elit, sed do eiusmod," "Lorem ipsum dolor sit amet, 013-74-3285 adipiscing elit, sed do eiusmod," or "Lorem ipsum dolor sit amet, conse013-74-3285ctetur adipiscing elit, sed do eiusmod." In some embodiments, a training sequence may include multiple data sequences.

After step 601 and step 603, process 600 may proceed to step 607. In step 607, system 100 may generate a label sequence. In some aspects, the label sequence may indicate a position of the inserted data sequence in the training sequence. In various aspects, the label sequence may indicate the class of the data sequence. As a non-limiting example, when the training sequence is "dolor sit amet, 013-74-3285 consectetur adipiscing," the label sequence may be "0000000000000000011111111110000000000000-0000000000," where the value "0" indicates that a character is not part of a sensitive data portion and the value "1" indicates that a character is part of the social security number. A different class or subclass of data sequence could include a different value specific to that class or subclass. Because system 100 creates the training sequences, system 100 may automatically create accurate labels for the training sequences.

Process 600 may then proceed to step 609. In step 609, system 100 may be configured to use the training sequences and the label sequences to train a classifier. In some aspects, the label sequences may provide a "ground truth" for training a classifier using supervised learning. In some embodiments, the classifier may be a recurrent neural network (which may include LSTM units). The recurrent neural network may be configured to predict whether a character of a training sequence is part of a sensitive data portion. This prediction may be checked against the label sequence to generate an update to the weights and offsets of the recurrent neural network. This update may then be propagated through the recurrent neural network, according to methods described in "Training Recurrent Neural Networks," 2013, by Ilya Sutskever, which is incorporated herein by reference in its entirety.

Figure 7:
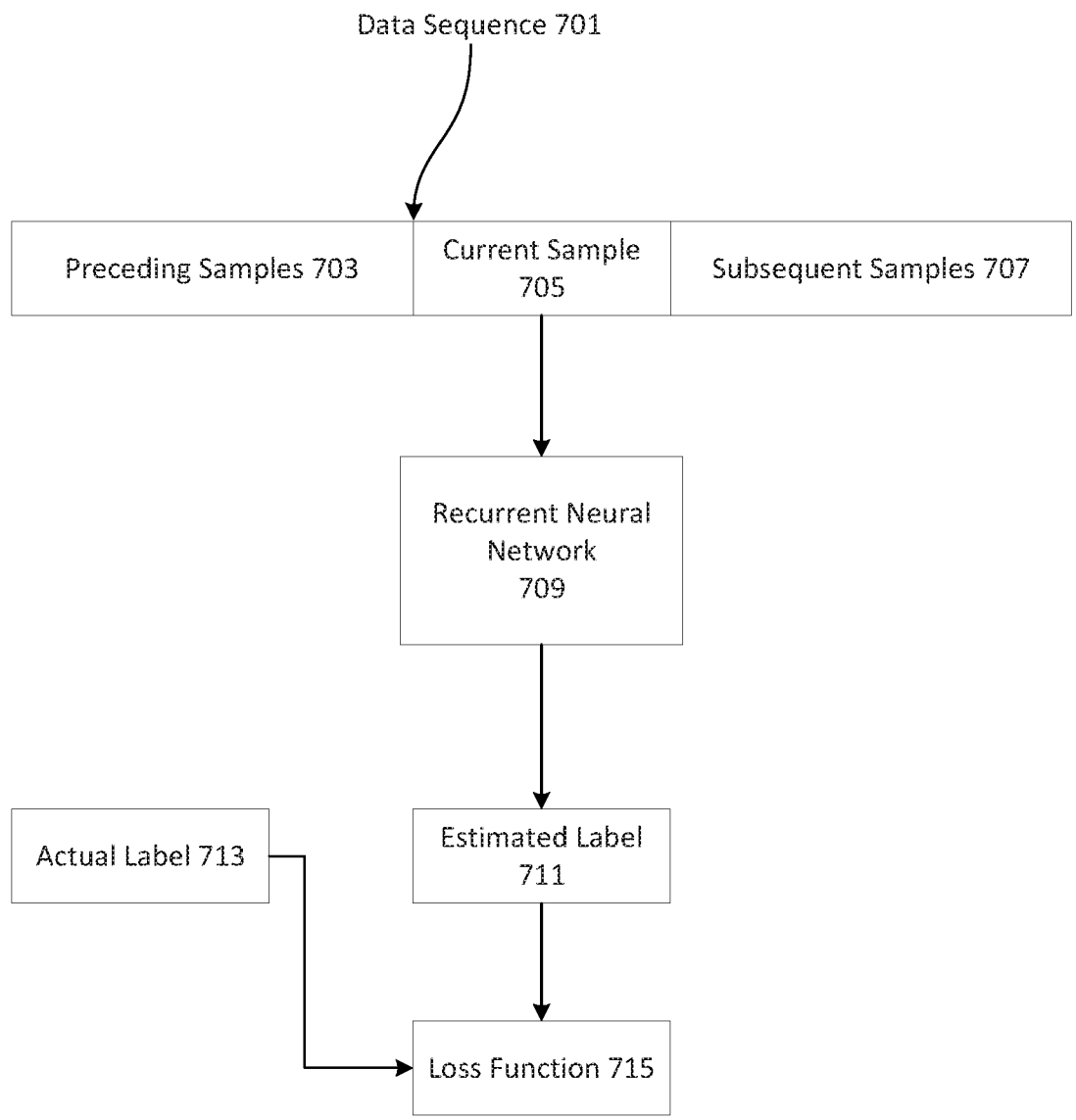
FIG. 7 depicts an exemplary process for training a classifier for generation of synthetic data, consistent with disclosed embodiments.

FIG. 7 depicts a process 700 for training a classifier for generation of synthetic data, consistent with disclosed embodiments. According to process 700, a data sequence 701 may include preceding samples 703, current sample 705, and subsequent samples 707. In some embodiments, data sequence 701 may be a subset of a training sequence, as described above with regard to FIG. 6. Data sequence 701 may be applied to recurrent neural network 709. In some embodiments, neural network 709 may be configured to estimate whether current sample 705 is part of a sensitive data portion of data sequence 701 based on the values of preceding samples 703, current sample 705, and subsequent samples 707. In some embodiments, preceding samples 703 may include between 1 and 100 samples, for example between 25 and 75 samples. In various embodiments, subsequent samples 707 may include between 1 and 100 samples, for example between 25 and 75 samples. In some embodiments, the preceding samples 703 and the subsequent samples 707 may be paired and provided to recurrent neural network 709 together. For example, in a first iteration, the first sample of preceding samples 703 and the last sample of subsequent samples 707 may be provided to recurrent neural network 709. In the next iteration, the second sample of preceding samples 703 and the second-to-last sample of subsequent samples 707 may be provided to recurrent neural network 709. System 100 may continue to provide samples to recurrent neural network 709 until all of preceding samples 703 and subsequent samples 707 have been input to recurrent neural network 709. System 100 may then provide current sample 705 to recurrent neural network 709. The output of recurrent neural network 709 after the input of current sample 705 may be estimated label 711. Estimated label 711 may be the inferred class or subclass of current sample 705, given data sequence 701 as input. In some embodiments, estimated label 711 may be compared to actual label 713 to calculate a loss function. Actual label 713 may correspond to data sequence 701. For example, when data sequence 701 is a subset of a training sequence, actual label 713 may be an element of the label sequence corresponding to the training sequence. In some embodiments, actual label 713 may occupy the same position in the label sequence as occupied by current sample 705 in the training sequence. Consistent with disclosed embodiments, system 100 may be configured to update recurrent neural network 709 using loss function 715 based on a result of the comparison.

Figure 8:
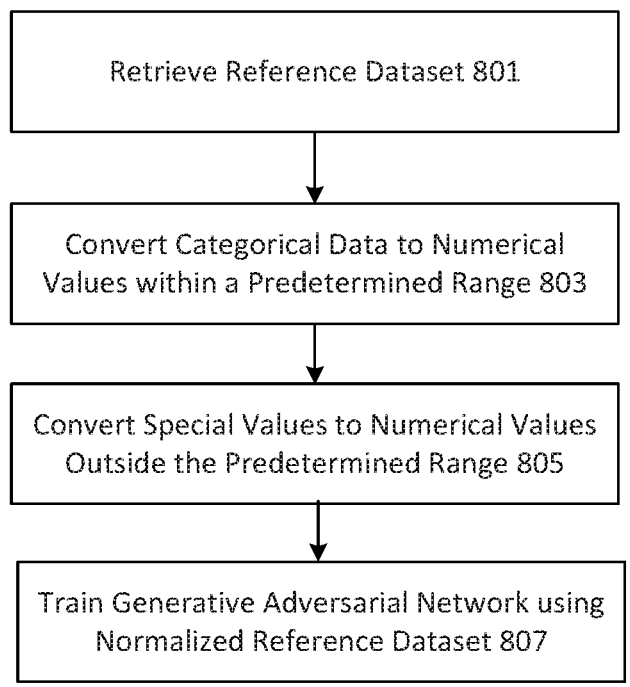
FIG. 8 depicts an exemplary process for training a generative adversarial using a normalized reference dataset, consistent with disclosed embodiments.

FIG. 8 depicts a process 800 for training a generative adversarial network using a normalized reference dataset. In some embodiments, the generative adversarial network may be used by system 100 (e.g., by dataset generator 103) to generate synthetic data (e.g., as described above with regards to FIGS. 2, 3, 5A and 5B). The generative adversarial network may include a generator network and a discriminator network. The generator network may be configured to learn a mapping from a sample space (e.g., a random number or vector) to a data space (e.g., the values of the sensitive data). The discriminator may be configured to determine, when presented with either an actual data sample or a sample of synthetic data generated by the generator network, whether the sample was generated by the generator network or was a sample of actual data. As training progresses, the generator may improve at generating the synthetic data and the discriminator may improve at determining whether a sample is actual or synthetic data. In this manner, a generator may be automatically trained to generate synthetic data similar to the actual data. However, a generative adversarial network may be limited by the actual data. For example, an unmodified generative adversarial network may be unsuitable for use with categorical data or data including missing values, not-a-numbers, or the like. For example, the generative adversarial network may not know how to interpret such data. Disclosed embodiments address this technical problem by at least one of normalizing categorical data or replacing missing values with supra-normal values.

Process 800 may then proceed to step 801. In step 801, system 100 (e.g., dataset generator 103) may retrieve a reference dataset from a database (e.g., database 105). The reference dataset may include categorical data. For example, the reference dataset may include spreadsheets or relational databases with categorical-valued data columns. As a further example, the reference dataset may include missing values, not-a-number values, or the like.

Process 800 may then proceed to step 803. In step 803, system 100 (e.g., dataset generator 103) may generate a normalized training dataset by normalizing the reference dataset. For example, system 100 may be configured to normalize categorical data contained in the reference dataset. In some embodiments, system 100 may be configured to normalize the categorical data by converting this data to numerical values. The numerical values may lie within a predetermined range. In some embodiments, the predetermined range may be zero to one. For example, given a column of categorical data including the days of the week, system 100 may be configured to map these days to values between zero and one. In some embodiments, system 100 may be configured to normalize numerical data in the reference dataset as well, mapping the values of the numerical data to a predetermined range.

Process 800 may then proceed to step 805. In step 805, system 100 (e.g., dataset generator 103) may generate the normalized training dataset by converting special values to values outside the predetermined range. For example, system 100 may be configured to assign missing values a first numerical value outside the predetermined range. As an additional example, system 100 may be configured to assign not-a-number values to a second numerical value outside the predetermined range. In some embodiments, the first value and the second value may differ. For example, system 100 may be configured to map the categorical values and the numerical values to the range of zero to one. In some embodiments, system 100 may then map missing values to the numerical value 1.5. In various embodiments, system 100 may then map not-a-number values to the numerical value of −0.5. In this manner system 100 may preserve information about the actual data while enabling training of the generative adversarial network.

Process 800 may then proceed to step 807. In step 807, system 100 (e.g., dataset generator 103) may train the generative network using the normalized dataset, consistent with disclosed embodiments.

Figure 9:
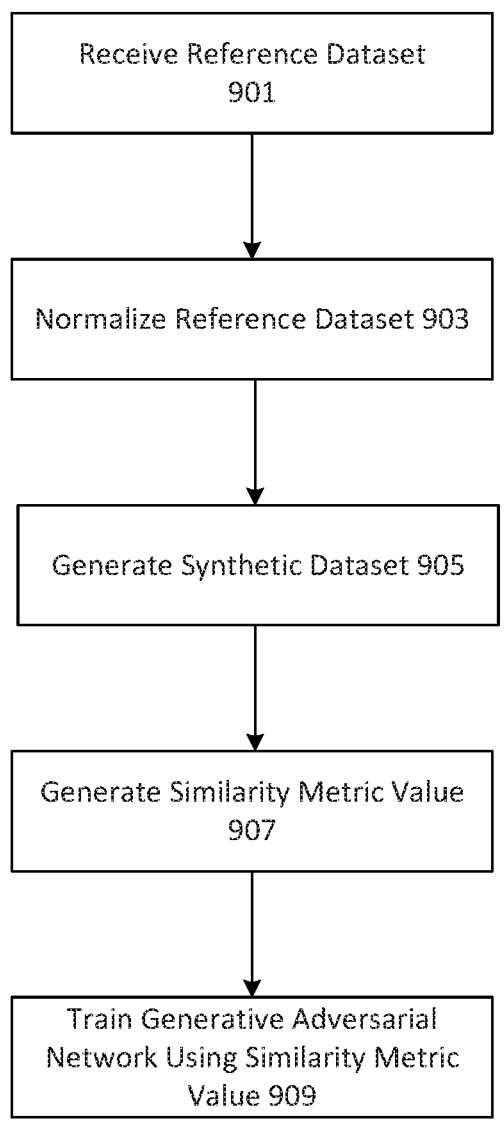
FIG. 9 depicts an exemplary process for training a generative adversarial network using a loss function configured to ensure a predetermined degree of similarity, consistent with disclosed embodiments.

FIG. 9 depicts a process 900 for training a generative adversarial network using a loss function configured to ensure a predetermined degree of similarity, consistent with disclosed embodiments. System 100 may be configured to use process 900 to generate synthetic data that is similar, but not too similar to actual data, as the actual data may include sensitive personal information. For example, when the actual data includes social security numbers or account numbers, the synthetic data would preferably not simply recreate these numbers. Instead, system 100 would preferably create synthetic data that resembles the actual data, as described below, while reducing the likelihood of overlapping values. To address this technical problem, system 100 may be configured to determine a similarity metric value between the synthetic dataset and the normalized reference dataset, consistent with disclosed embodiments. System 100 may be configured to use the similarity metric value to update a loss function for training the generative adversarial network. In this manner, system 100 may be configured to generate a synthetic dataset differing in value from the normalized reference dataset at least a predetermined amount according to the similarity metric.

While described below with regard to training a synthetic data model, dataset generator 103 may be configured to use such trained synthetic data models to generate synthetic data (e.g., as described above with regards to FIGS. 2 and 3). For example, development instances (e.g., development instance 407) and production instances (e.g., production instance 413) may be configured to generate data similar to a reference dataset according to the disclosed systems and methods.

Process 900 may then proceed to step 901, which may resemble step 801. In step 901, system 100 (e.g., model optimizer 107, computational resources 101, or the like) may receive a reference dataset. In some embodiments, system 100 may be configured to receive the reference dataset from a database (e.g., database 105). The reference dataset may include categorical and/or numerical data. For example, the reference dataset may include spreadsheet or relational database data. In some embodiments, the reference dataset may include special values, such as missing values, not-a-number values, or the like.

Process 900 may then proceed to step 903. In step 903, system 100 (e.g., dataset generator 103, model optimizer 107, computational resources 101, or the like) may be configured to normalize the reference dataset. In some instances, system 100 may be configured to normalize the reference dataset as described above with regard to steps 803 and 805 of process 800. For example, system 100 may be configured to normalize the categorical data and/or the numerical data in the reference dataset to a predetermined range. In some embodiments, system 100 may be configured to replace special values with numerical values outside the predetermined range.

Process 900 may then proceed to step 905. In step 905, system 100 (e.g., model optimizer 107, computational resources 101, or the like) may generate a synthetic training dataset using the generative network. For example, system 100 may apply one or more random samples to the generative network to generate one or more synthetic data items. In some instances, system 100 may be configured to generate between 200 and 400,000 data items, or preferably between 20,000 and 40,000 data items.

Process 900 may then proceed to step 907. In step 907, system 100 (e.g., model optimizer 107, computational resources 101, or the like) may determine a similarity metric value using a normalized reference dataset and a synthetic dataset. System 100 may be configured to generate the similarity metric value according to a similarity metric. In some aspects, the similarity metric value may include at least one of a statistical correlation score (e.g., a score dependent on the covariances, univariate, or multivariate distributions of the synthetic data and the normalized reference data), a data similarity score (e.g., a score dependent on a number of matching or similar elements in the synthetic dataset and normalized reference dataset), or data quality score (e.g., a score dependent on at least one of a number of duplicate elements in each of the synthetic dataset and normalized reference dataset, a prevalence of the most common value in each of the synthetic dataset and normalized reference dataset, a maximum difference of rare values in each of the synthetic dataset and normalized reference dataset, the differences in schema between the synthetic dataset and normalized reference dataset, or the like). System 100 may be configured to calculate these scores using the synthetic dataset and a reference dataset.

In some aspects, a similarity metric may depend on (i.e., may be based on) a covariance of a synthetic dataset and a covariance of a normalized reference dataset. For example, in some embodiments, system 100 may be configured to generate a difference matrix using a covariance matrix of the normalized reference dataset and a covariance matrix of the synthetic dataset. As a further example, the difference matrix may be the difference between the covariance matrix of the normalized reference dataset and the covariance matrix of the synthetic dataset. A similarity metric may depend on the difference matrix. In some aspects, the similarity metric may depend on the summation of the squared values of the difference matrix. This summation may be normalized, for example by the square root of the product of the number of rows and number of columns of the covariance matrix for the normalized reference dataset.

In some embodiments, the similarity metric may depend on a univariate value distribution of an element of the synthetic dataset and a univariate value distribution of an element of the normalized reference dataset. For example, for corresponding elements of the synthetic dataset and the normalized reference dataset, system 100 may be configured to generate histograms having the same bins. For each bin, system 100 may be configured to determine a difference between the value of the bin for the synthetic data histogram and the value of the bin for the normalized reference dataset histogram. In some embodiments, the values of the bins may be normalized by the total number of datapoints in the histograms. For each of the corresponding elements, system 100 may be configured to determine a value (e.g., a maximum difference, an average difference, a Euclidean distance, or the like) of these differences. In some embodiments, the similarity metric may depend on a function of this value (e.g., a maximum, average, or the like) across the common elements. For example, the normalized reference dataset may include multiple columns of data. The synthetic dataset may include corresponding columns of data. The normalized reference dataset and the synthetic dataset may include the same number of rows. System 100 may be configured to generate histograms for each column of data for each of the normalized reference dataset and the synthetic dataset. For each bin, system 100 may determine the difference between the count of datapoints in the normalized reference dataset histogram and the synthetic dataset histogram. System 100 may determine the value for this column to be the maximum of the differences for each bin. System 100 may determine the value for the similarity metric to be the average of the values for the columns. As would be appreciated by one of skill in the art, this example is not intended to be limiting.

In various embodiments, a similarity metric may depend on a number of elements of a synthetic dataset that match elements of a reference dataset. In some embodiments, a match may be an exact match, with the value of an element in the synthetic dataset matching the value of an element in the normalized reference dataset. As a nonlimiting example, when the normalized reference dataset includes a spreadsheet having rows and columns, and the synthetic dataset includes a spreadsheet having rows and corresponding columns, the similarity metric may depend on the number of rows of the synthetic dataset that match rows of the normalized reference dataset. In some embodiments, a normalized reference dataset and a synthetic dataset may have duplicate rows removed prior to performing this comparison. System 100 may be configured to merge the non-duplicate normalized reference dataset and non-duplicate synthetic dataset by all columns. In this non-limiting example, the size of the resulting dataset will be the number of exactly matching rows. In some embodiments, system 100 may be configured to disregard columns that appear in one dataset but not the other when performing this comparison.

In various embodiments, the similarity metric may depend on a number of elements of the synthetic dataset that are similar to elements of the normalized reference dataset. System 100 may be configured to calculate similarity between an element of the synthetic dataset and an element of the normalized reference dataset according to distance measure. In some embodiments, the distance measure may depend on a Euclidean distance between the elements. For example, when the synthetic dataset and the normalized reference dataset include rows and columns, the distance measure may depend on a Euclidean distance between a row of the synthetic dataset and a row of the normalized reference dataset. In various embodiments, when comparing a synthetic dataset to an actual dataset including categorical data (e.g., a reference dataset that has not been normalized), the distance measure may depend on a Euclidean distance between numerical row elements and a Hamming distance between non-numerical row elements. The Hamming distance may depend on a count of non-numerical elements differing between the row of the synthetic dataset and the row of the actual dataset. In some embodiments, the distance measure may be a weighted average of the Euclidean distance and the Hamming distance. In some embodiments, system 100 may be configured to disregard columns that appear in one dataset but not the other when performing this comparison. In various embodiments, system 100 may be configured to remove duplicate entries from the synthetic dataset and the normalized reference dataset before performing the comparison.

In some embodiments, system 100 may be configured to calculate a distance measure between each row of the synthetic dataset (or a subset of the rows of the synthetic dataset) and each row of the normalized reference dataset (or a subset of the rows of the normalized reference dataset). System 100 may then determine the minimum distance value for each row of the synthetic dataset across all rows of the normalized reference dataset. In some embodiments, the similarity metric may depend on a function of the minimum distance values for all rows of the synthetic dataset (e.g., a maximum value, an average value, or the like).

In some embodiments, the similarity metric may depend on a frequency of duplicate elements in the synthetic dataset and the normalized reference dataset. In some aspects, system 100 may be configured to determine the number of duplicate elements in each of the synthetic dataset and the normalized reference dataset. In various aspects, system 100 may be configured to determine the proportion of each dataset represented by at least some of the elements in each dataset. For example, system 100 may be configured to determine the proportion of the synthetic dataset having a particular value. In some aspects, this value may be the most frequent value in the synthetic dataset. System 100 may be configured to similarly determine the proportion of the normalized reference dataset having a particular value (e.g., the most frequent value in the normalized reference dataset).

In some embodiments, the similarity metric may depend on a relative prevalence of rare values in the synthetic and normalized reference dataset. In some aspects, such rare values may be those present in a dataset with frequencies less than a predetermined threshold. In some embodiments, the predetermined threshold may be a value less than 20%, for example 10%. System 100 may be configured to determine a prevalence of rare values in the synthetic and normalized reference dataset. For example, system 100 may be configured to determine counts of the rare values in a dataset and the total number of elements in the dataset. System 100 may then determine ratios of the counts of the rare values to the total number of elements in the datasets.

In some embodiments, the similarity metric may depend on differences in the ratios between the synthetic dataset and the normalized reference dataset. As a non-limiting example, an exemplary dataset may be an access log for patient medical records that tracks the job title of the employee accessing a patient medical record. The job title "Administrator" may be a rare value of job title and appear in 3% of the log entries. System 100 may be configured to generate synthetic log data based on the actual dataset, but the job title "Administrator" may not appear in the synthetic log data. The similarity metric may depend on difference between the actual dataset prevalence (3%) and the synthetic log data prevalence (0%). As an alternative example, the job title "Administrator" may be overrepresented in the synthetic log data, appearing in 15% of the of the log entries (and therefore not a rare value in the synthetic log data when the predetermined threshold is 10%). In this example, the similarity metric may depend on difference between the actual dataset prevalence (3%) and the synthetic log data prevalence (15%).

In various embodiments, the similarity metric may depend on a function of the differences in the ratios between the synthetic dataset and the normalized reference dataset. For example, the actual dataset may include 10 rare values with a prevalence under 10% of the dataset. The difference between the prevalence of these 10 rare values in the actual dataset and the normalized reference dataset may range from −5% to 4%. In some embodiments, the similarity metric may depend on the greatest magnitude difference (e.g., the similarity metric could depend on the value −5% as the greatest magnitude difference). In various embodiments, the similarity metric may depend on the average of the magnitude differences, the Euclidean norm of the ratio differences, or the like.

In various embodiments, the similarity metric may depend on a difference in schemas between the synthetic dataset and the normalized reference dataset. For example, when the synthetic dataset includes spreadsheet data, system 100 may be configured to determine a number of mismatched columns between the synthetic and normalized reference datasets, a number of mismatched column types between the synthetic and normalized reference datasets, a number of mismatched column categories between the synthetic and normalized reference datasets, and number of mismatched numeric ranges between the synthetic and normalized reference datasets. The value of the similarity metric may depend on the number of at least one of the mismatched columns, mismatched column types, mismatched column categories, or mismatched numeric ranges.

In some embodiments, the similarity metric may depend on one or more of the above criteria. For example, the similarity metric may depend on one or more of (1) a covariance of the output data and a covariance of the normalized reference dataset, (2) a univariate value distribution of an element of the synthetic dataset, (3) a univariate value distribution of an element of the normalized reference dataset, (4) a number of elements of the synthetic dataset that match elements of the reference dataset, (5) a number of elements of the synthetic dataset that are similar to elements of the normalized reference dataset, (6) a distance measure between each row of the synthetic dataset (or a subset of the rows of the synthetic dataset) and each row of the normalized reference dataset (or a subset of the rows of the normalized reference dataset), (7) a frequency of duplicate elements in the synthetic dataset and the normalized reference dataset, (8) a relative prevalence of rare values in the synthetic and normalized reference dataset, and (9) differences in the ratios between the synthetic dataset and the normalized reference dataset.

System 100 may compare a synthetic dataset to a normalized reference dataset, a synthetic dataset to an actual (unnormalized) dataset, or to compare two datasets according to a similarity metric consistent with disclosed embodiments. For example, in some embodiments, model optimizer 107 may be configured to perform such comparisons. In various embodiments, model storage 105 may be configured to store similarity metric information (e.g., similarity values, indications of comparison datasets, and the like) together with a synthetic dataset.

Process 900 may then proceed to step 909. In step 909, system 100 (e.g., model optimizer 107, computational resources 101, or the like) may train the generative adversarial network using the similarity metric value. In some embodiments, system 100 may be configured to determine that the synthetic dataset satisfies a similarity criterion. The similarity criterion may concern at least one of the similarity metrics described above. For example, the similarity criterion may concern at least one of a statistical correlation score between the synthetic dataset and the normalized reference dataset, a data similarity score between the synthetic dataset and the reference dataset, or a data quality score for the synthetic dataset.

In some embodiments, synthetic data satisfying the similarity criterion may be too similar to the reference dataset. System 100 may be configured to update a loss function for training the generative adversarial network to decrease the similarity between the reference dataset and synthetic datasets generated by the generative adversarial network when the similarity criterion is satisfied. In particular, the loss function of the generative adversarial network may be configured to penalize generation of synthetic data that is too similar to the normalized reference dataset, up to a certain threshold. To that end, a penalty term may be added to the loss function of the generative adversarial network. This term may penalize the calculated loss if the dissimilarity between the synthetic data and the actual data goes below a certain threshold. In some aspects, this penalty term may thereby ensure that the value of the similarity metric exceeds some similarity threshold, or remains near the similarity threshold (e.g., the value of the similarity metric may exceed 90% of the value of the similarity threshold). In this non-limiting example, decreasing values of the similarity metric may indicate increasing similarity. System 100 may then update the loss function such that the likelihood of generating synthetic data like the current synthetic data is reduced. In this manner, system 100 may train the generative adversarial network using a loss function that penalizes generation of data differing from the reference dataset by less than the predetermined amount.

Figure 10:
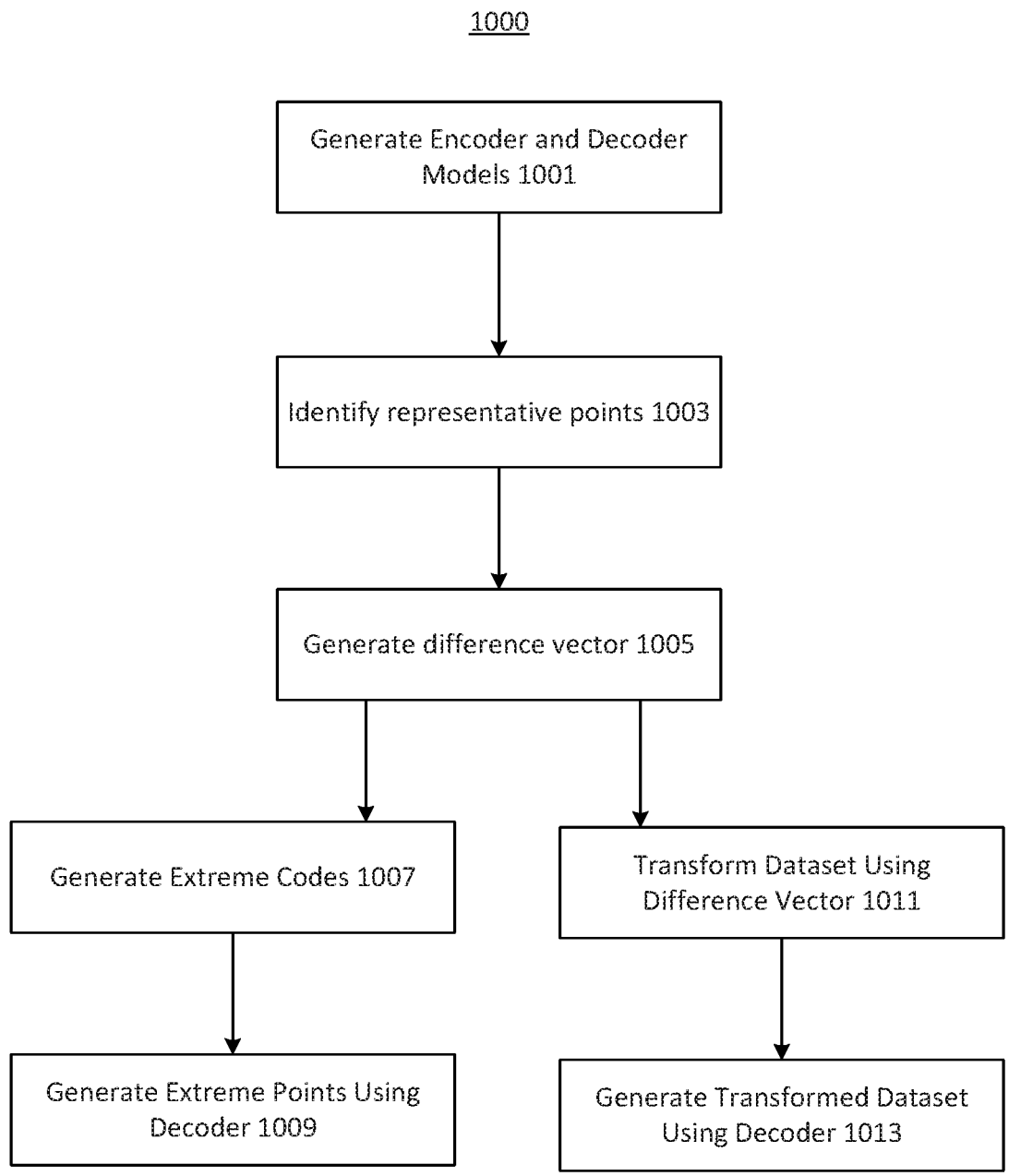
FIG. 10 depicts an exemplary process for supplementing or transform datasets using code-space operations, consistent with disclosed embodiments.

FIG. 10 depicts a process 1000 for supplementing or transforming datasets using code-space operations, consistent with disclosed embodiments. Process 1000 may include generating encoder and decoder models that map between a code space and a sample space, identifying representative points in code space, generating a difference vector in code space, and generating extreme points or transforming a dataset using the difference vector. In this manner, process 1000 may support model validation and simulation of conditions differing from those present during generation of a training dataset. For example, while existing systems and methods may train models using datasets representative of typical operating conditions, process 1000 may support model validation by inferring datapoints that occur infrequently or outside typical operating conditions. As an additional example, training data may include operations and interactions typical of a first user population. Process 1000 may support simulation of operations and interactions typical of a second user population that differs from the first user population. To continue this example, a young user population may interact with a system. Process 1000 may support generation of a synthetic training dataset representative of an older user population interacting with the system. This synthetic training dataset may be used to simulate performance of the system with an older user population, before developing that userbase.

After starting, process 1000 may proceed to step 1001. In step 1001, system 1001 may generate an encoder model and a decoder model. Consistent with disclosed embodiments, system 100 may be configured to generate an encoder model and decoder model using an adversarially learned inference model, as disclosed in "Adversarially Learned Inference" by Vincent Dumoulin, et al. According to the adversarially learned inference model, an encoder maps from a sample space to a code space and a decoder maps from a code space to a sample space. The encoder and decoder are trained by selecting either a code and generating a sample using the decoder or by selecting a sample and generating a code using the encoder. The resulting pairs of code and sample are provided to a discriminator model, which is trained to determine whether the pairs of code and sample came from the encoder or decoder. The encoder and decoder may be updated based on whether the discriminator correctly determined the origin of the samples. Thus, the encoder and decoder may be trained to fool the discriminator. When appropriately trained, the joint distribution of code and sample for the encoder and decoder match. As would be appreciated by one of skill in the art, other techniques of generating a mapping from a code space to a sample space may also be used. For example, a generative adversarial network may be used to learn a mapping from the code space to the sample space.

Process 1000 may then proceed to step 1003. In step 1003, system 100 may identify representative points in the code space. System 100 may identify representative points in the code space by identifying points in the sample space, mapping the identified points into code space, and determining the representative points based on the mapped points, consistent with disclosed embodiments. In some embodiments, the identified points in the sample space may be elements of a dataset (e.g., an actual dataset or a synthetic dataset generated using an actual dataset).

System 100 may identify points in the sample space based on sample space characteristics. For example, when the sample space includes financial account information, system 100 may be configured to identify one or more first accounts belonging to users in their 20s and one or more second accounts belonging to users in their 40s.

Consistent with disclosed embodiments, identifying representative points in the code space may include a step of mapping the one or more first points in the sample space and the one or more second points in the sample space to corresponding points in the code space. In some embodiments, the one or more first points and one or more second points may be part of a dataset. For example, the one or more first points and one or more second points may be part of an actual dataset or a synthetic dataset generated using an actual dataset.

System 100 may be configured to select first and second representative points in the code space based on the mapped one or more first points and the mapped one or more second points. As shown in FIG. 11A, when the one or more first points include a single point, the mapping of this single point to the code space (e.g., point 1101) may be a first representative point in code space 1100. Likewise, when the one or more second points include a single point, the mapping of this single point to the code space (e.g., point 1103) may be a second representative point in code space 1100.

Figure 11B:
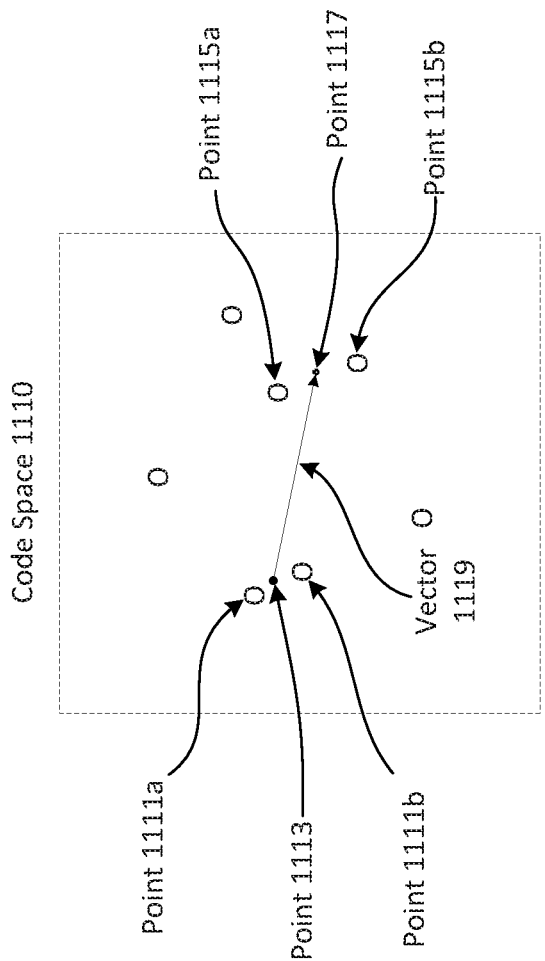
FIGS. 11A and 11B depict an exemplary illustration of points in code-space, consistent with disclosed embodiments.
Figure 11A:
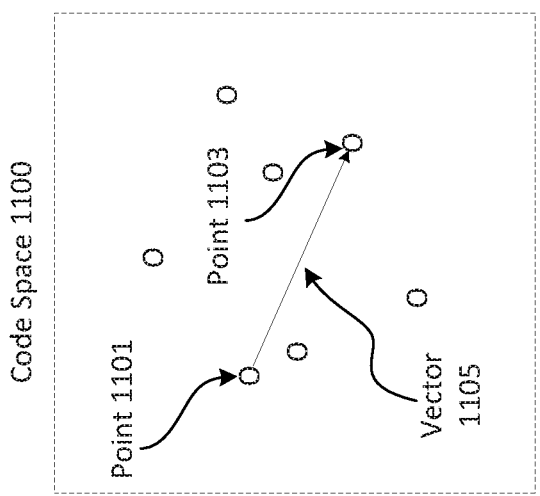

As shown in FIG. 11B, when the one or more first points include multiple points, system 100 may be configured to determine a first representative point in code space 1110. In some embodiments, system 100 may be configured to determine the first representative point based on the locations of the mapped one or more first points in the code space. In some embodiments, the first representative point may be a centroid or a medoid of the mapped one or more first points. Likewise, system 100 may be configured to determine the second representative point based on the locations of the mapped one or more second points in the code space. In some embodiments, the second representative point may be a centroid or a medoid of the mapped one or more second points. For example, system 100 may be configured to identify point 1113 as the first representative point based on the locations of mapped points 1111a and 1111b. Likewise, system 100 may be configured to identify point 1117 as the second representative point based on the locations of mapped points 1115a and 1115b.

In some embodiments, the code space may include a subset of $R^n$. System 100 may be configured to map a dataset to the code space using the encoder. System 100 may then identify the coordinates of the points with respect to a basis vector in $R^n$ (e.g., one of the vectors of the identity matrix). System 100 may be configured to identify a first point with a minimum coordinate value with respect to the basis vector and a second point with a maximum coordinate value with respect to the basis vector. System 100 may be configured to identify these points as the first and second representative points. For example, taking the identity matrix as the basis, system 100 may be configured to select as the first point the point with the lowest value of the first element of the vector. To continue this example, system 100 may be configured to select as the second point the point with the highest value of the first element of the vector. In some embodiments, system 100 may be configured to repeat process 1000 for each vector in the basis.

Process 1000 may then proceed to step 1005. In step 1005, system 100 may determine a difference vector connecting the first representative point and the second representative point. For example, as shown in FIG. 11A, system 100 may be configured to determine a vector 1105 from first representative point 1101 to second representative point 1103. Likewise, as shown in FIG. 11B, system 100 may be configured to determine a vector 1119 from first representative point 1113 to second representative point 1117.

Figures 12A, 12B:
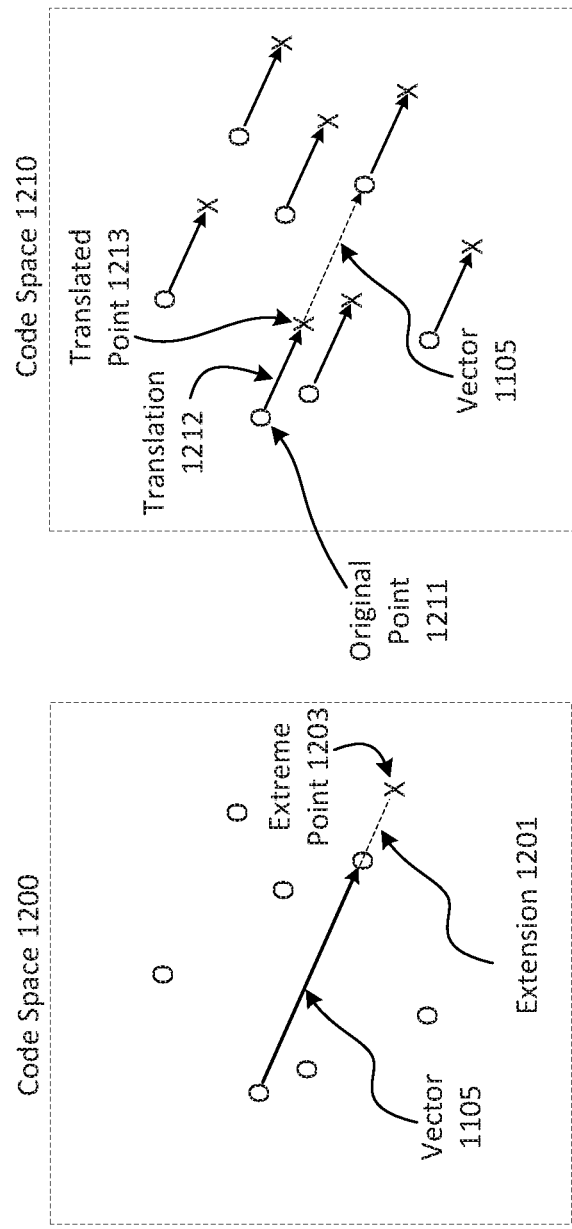
FIG. 12A depicts an exemplary illustration of supplementing datasets using code-space operations, consistent with disclosed embodiments.
FIG. 12B depicts an exemplary illustration of transforming datasets using code-space operations, consistent with disclosed embodiments.

Process 1000 may then proceed to step 1007. In step 1007, as depicted in FIG. 12A, system 100 may generate extreme codes. Consistent with disclosed embodiments, system 100 may be configured to generate extreme codes by sampling the code space (e.g., code space 1200) along an extension (e.g., extension 1201) of the vector connecting the first representative point and the second representative point (e.g., vector 1105). In this manner, system 100 may generate a code extreme with respect to the first representative point and the second representative point (e.g., extreme point 1203).

Process 1000 may then proceed to step 1009. In step 1009, as depicted in FIG. 12A, system 100 may generate extreme samples. Consistent with disclosed embodiments, system 100 may be configured to generate extreme samples by converting the extreme code into the sample space using the decoder trained in step 1001. For example, system 100 may be configured to convert extreme point 1203 into a corresponding datapoint in the sample space.

Process 1000 may then proceed to step 1011. In step 1011, as depicted in FIG. 12B, system 100 may translate a dataset using the difference vector determined in step 1005 (e.g., difference vector 1105). In some aspects, system 100 may be configured to convert the dataset from sample space to code space using the encoder trained in step 1001. System 100 may be configured to then translate the elements of the dataset in code space using the difference vector. In some aspects, system 100 may be configured to translate the elements of the dataset using the vector and a scaling factor. In some aspects, the scaling factor may be less than one. In various aspects, the scaling factor may be greater than or equal to one. For example, as shown in FIG. 12B, the elements of the dataset may be translated in code space 1210 by the product of the difference vector and the scaling factor (e.g., original point 1211 may be translated by translation 1212 to translated point 1213).

Process 1000 may then proceed to step 1013. In step 1013, as depicted in FIG. 12B, system 100 may generate a translated dataset. Consistent with disclosed embodiments, system 100 may be configured to generate the translated dataset by converting the translated points into the sample space using the decoder trained in step 1001. For example, system 100 may be configured to convert extreme point translated point 1213 into a corresponding datapoint in the sample space.

Figure 13:
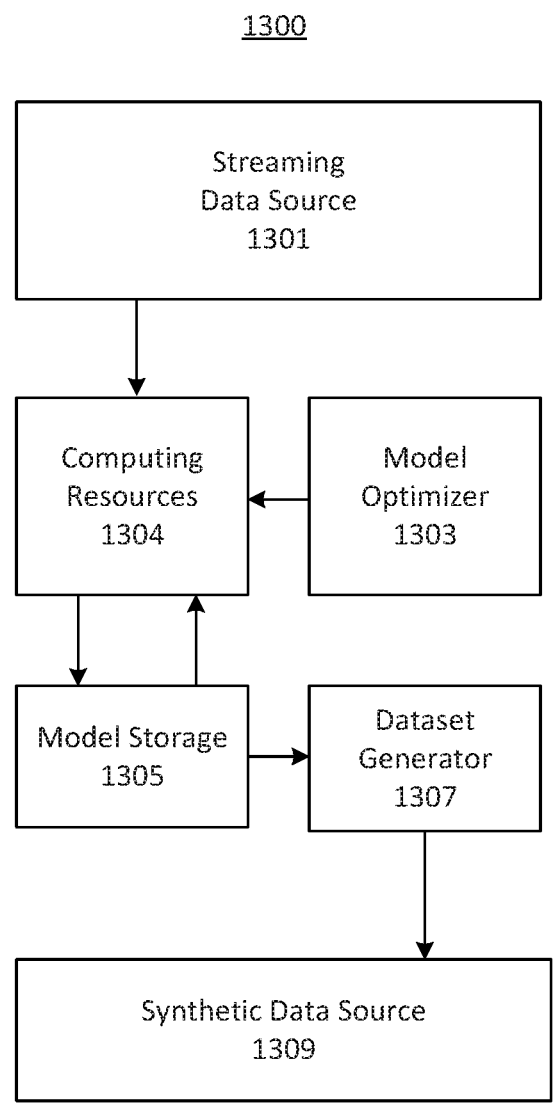
FIG. 13 depicts an exemplary cloud computing system for generating a synthetic data stream that tracks a reference data stream, consistent with disclosed embodiments.

FIG. 13 depicts an exemplary cloud computing system 1300 for generating a synthetic data stream that tracks a reference data stream. The flow rate of the synthetic data may resemble the flow rate of the reference data stream, as system 1300 may generate synthetic data in response to receiving reference data stream data. System 1300 may include a streaming data source 1301, model optimizer 1303, computing resource 1304, model storage 1305, dataset generator 1307, and synthetic data source 1309. System 1300 may be configured to generate a new synthetic data model using actual data received from streaming data source 1301. Streaming data source 1301, model optimizer 1303, computing resources 1304, and model storage 1305 may interact to generate the new synthetic data model, consistent with disclosed embodiments. In some embodiments, system 1300 may be configured to generate the new synthetic data model while also generating synthetic data using a current synthetic data model.

Streaming data source 1301 may be configured to retrieve new data elements from a database, a file, a datasource, a topic in a data streaming platform (e.g., IBM STREAMS), a topic in a distributed messaging system (e.g., APACHE KAFKA), or the like. In some aspects, streaming data source 1301 may be configured to retrieve new elements in response to a request from model optimizer 1303. In some aspects, streaming data source 1301 may be configured to retrieve new data elements in real-time. For example, streaming data source 1301 may be configured to retrieve log data, as that log data is created. In various aspects, streaming data source 1301 may be configured to retrieve batches of new data. For example, streaming data source 1301 may be configured to periodically retrieve all log data created within a certain period (e.g., a five-minute interval). In some embodiments, the data may be application logs. The application logs may include event information, such as debugging information, transaction information, user information, user action information, audit information, service information, operation tracking information, process monitoring information, or the like. In some embodiments, the data may be JSON data (e.g., JSON application logs).

System 1300 may be configured to generate a new synthetic data model, consistent with disclosed embodiments. Model optimizer 1303 may be configured to provision computing resources 1304 with a data model, consistent with disclosed embodiments. In some aspects, computing resources 1304 may resemble computing resources 101, described above with regard to FIG. 1. For example, computing resources 1304 may provide similar functionality and may be similarly implemented. The data model may be a synthetic data model. The data model may be a current data model configured to generate data similar to recently received data in the reference data stream. The data model may be received from model storage 1305. For example, model optimizer 1303 may be configured to provide instructions to computing resources 1304 to retrieve a current data model of the reference data stream from model storage 1305. In some embodiments, the synthetic data model may include a recurrent neural network, a kernel density estimator, or a generative adversarial network.

Computing resources 1304 may be configured to train the new synthetic data model using reference data stream data. In some embodiments, system 1300 (e.g., computing resources 1304 or model optimizer 1303) may be configured to include reference data stream data into the training data as it is received from streaming data source 1301. The training data may therefore reflect the current characteristics of the reference data stream (e.g., the current values, current schema, current statistical properties, and the like). In some aspects, system 1300 (e.g., computing resources 1304 or model optimizer 1303) may be configured to store reference data stream data received from streaming data source 1301 for subsequent use as training data. In some embodiments, computing resources 1304 may have received the stored reference data stream data prior to beginning training of the new synthetic data model. As an additional example, computing resources 1304 (or another component of system 1300) may be configured to gather data from streaming data source 1301 during a first time-interval (e.g., the prior repeat) and use this gathered data to train a new synthetic model in a subsequent time-interval (e.g., the current repeat). In various embodiments, computing resources 1304 may be configured to use the stored reference data stream data for training the new synthetic data model. In various embodiments, the training data may include both newly-received and stored data. When the synthetic data model is a Generative Adversarial Network, computing resources 1304 may be configured to train the new synthetic data model, in some embodiments, as described above with regard to FIGS. 8 and 9. Alternatively, computing resources 1304 may be configured to train the new synthetic data model according to know methods.

Model optimizer 1303 may be configured to evaluate performance criteria of a newly created synthetic data model. In some embodiments, the performance criteria may include a similarity metric (e.g., a statistical correlation score, data similarity score, or data quality score, as described herein). For example, model optimizer 1303 may be configured to compare the covariances or univariate distributions of a synthetic dataset generated by the new synthetic data model and a reference data stream dataset. Likewise, model optimizer 1303 may be configured to evaluate the number of matching or similar elements in the synthetic dataset and reference data stream dataset. Furthermore, model optimizer 1303 may be configured to evaluate a number of duplicate elements in each of the synthetic dataset and reference data stream dataset, a prevalence of the most common value in synthetic dataset and reference data stream dataset, a maximum difference of rare values in each of the synthetic dataset and reference data stream dataset, differences in schema between the synthetic dataset and reference data stream dataset, and the like.

In various embodiments, the performance criteria may include prediction metrics. The prediction metrics may enable a user to determine whether data models perform similarly for both synthetic data and actual data. The prediction metrics may include a prediction accuracy check, a prediction accuracy cross check, a regression check, a regression cross check, and a principal component analysis check. In some aspects, a prediction accuracy check may determine the accuracy of predictions made by a model (e.g., recurrent neural network, kernel density estimator, or the like) given a dataset. For example, the prediction accuracy check may receive an indication of the model, a set of data, and a set of corresponding labels. The prediction accuracy check may return an accuracy of the model in predicting the labels given the data. Similar model performance for synthetic data and original data may indicate that the synthetic data preserves the latent feature structure of the original data. In various aspects, a prediction accuracy cross check may calculate the accuracy of a predictive model that is trained on synthetic data and tested on the original data used to generate the synthetic data. In some aspects, a regression check may regress a numerical column in a dataset against other columns in the dataset, determining the predictability of the numerical column given the other columns. In some aspects, a regression error cross check may determine a regression formula for a numerical column of the synthetic data and then evaluate the predictive ability of the regression formula for the numerical column of the actual data. In various aspects, a principal component analysis check may determine a number of principal component analysis columns sufficient to capture a predetermined amount of the variance in the dataset. Similar numbers of principal component analysis columns may indicate that the synthetic data preserves the latent feature structure of the original data.

Model optimizer 1303 may be configured to store the newly created synthetic data model and metadata for the new synthetic data model in model storage 1305 based on the evaluated performance criteria, consistent with disclosed embodiments. For example, model optimizer 1303 may be configured to store the metadata and new data model in model storage when a value of a similarity metric or a prediction metric satisfies a predetermined threshold. In some embodiments, the metadata may include at least one value of a similarity metric or prediction metric. In various embodiments, the metadata may include an indication of the origin of the new synthetic data model, the data used to generate the new synthetic data model, when the new synthetic data model was generated, and the like.

System 1300 may be configured to generate synthetic data using a current data model. In some embodiments, this generation may occur while system 1300 is training a new synthetic data model. Model optimizer 1303, model storage

1305, dataset generator 1307, and synthetic data source 1309 may interact to generate the synthetic data, consistent with disclosed embodiments.

Model optimizer 1303 may be configured to receive a request for a synthetic data stream from an interface (e.g., interface 113 or the like). In some aspects, model optimizer 1303 may resemble model optimizer 107, described above with regard to FIG. 1. For example, model optimizer 1303 may provide similar functionality and may be similarly implemented. In some aspects, requests received from the interface may indicate a reference data stream. For example, such a request may identify streaming data source 1301 and/or specify a topic or subject (e.g., a Kafka topic or the like). In response to the request, model optimizer 1303 (or another component of system 1300) may be configured to direct generation of a synthetic data stream that tracks the reference data stream, consistent with disclosed embodiments.

Dataset generator 1307 may be configured to retrieve a current data model of the reference data stream from model storage 1305. In some embodiments, dataset generator 1307 may resemble dataset generator 103, described above with regard to FIG. 1. For example, dataset generator 1307 may provide similar functionality and may be similarly implemented. Likewise, in some embodiments, model storage 1305 may resemble model storage 105, described above with regard to FIG. 1. For example, model storage 1305 may provide similar functionality and may be similarly implemented. In some embodiments, the current data model may resemble data received from streaming data source 1301 according to a similarity metric (e.g., a statistical correlation score, data similarity score, or data quality score, as described herein). In various embodiments, the current data model may resemble data received during a time interval extending to the present (e.g., the present hour, the present day, the present week, or the like). In various embodiments, the current data model may resemble data received during a prior time interval (e.g., the previous hour, yesterday, last week, or the like). In some embodiments, the current data model may be the most recently trained data model of the reference data stream.

Dataset generator 1307 may be configured to generate a synthetic data stream using the current data model of the reference data steam. In some embodiments, dataset generator 1307 may be configured to generate the synthetic data stream by replacing sensitive portions of the reference data steam with synthetic data, as described in FIGS. 5A and 5B. In various embodiments, dataset generator 1307 may be configured to generate the synthetic data stream without reference to the reference data steam data. For example, when the current data model is a recurrent neural network, dataset generator 1307 may be configured to initialize the recurrent neural network with a value string (e.g., a random sequence of characters), predict a new value based on the value string, and then add the new value to the end of the value string. Dataset generator 1307 may then predict the next value using the updated value string that includes the new value. In some embodiments, rather than selecting the most likely new value, dataset generator 1307 may be configured to probabilistically choose a new value. As a nonlimiting example, when the existing value string is "examin" the dataset generator 1307 may be configured to select the next value as "e" with a first probability and select the next value as "a" with a second probability. As an additional example, when the current data model is a generative adversarial network or an adversarially learned inference network, dataset generator 1307 may be configured to generate the synthetic data by selecting samples from a code space, as described herein.

In some embodiments, dataset generator 1307 may be configured to generate an amount of synthetic data equal to the amount of actual data retrieved from synthetic data stream 1309. In some aspects, the rate of synthetic data generation may match the rate of actual data generation. As a nonlimiting example, when streamlining data source 1301 retrieves a batch of 10 samples of actual data, dataset generator 1307 may be configured to generate a batch of 10 samples of synthetic data. As a further nonlimiting example, when streamlining data source 1301 retrieves a batch of actual data every 10 minutes, dataset generator 1307 may be configured to generate a batch of actual data every 10 minutes. In this manner, system 1300 may be configured to generate synthetic data similar in both content and temporal characteristics to the reference data stream data.

In various embodiments, dataset generator 1307 may be configured to provide synthetic data generated using the current data model to synthetic data source 1309. In some embodiments, synthetic data source 1309 may be configured to provide the synthetic data received from dataset generator 1307 to a database, a file, a datasource, a topic in a data streaming platform (e.g., IBM STREAMS), a topic in a distributed messaging system (e.g., APACHE KAFKA), or the like.

As discussed above, system 1300 may be configured to track the reference data stream by repeatedly switching data models of the reference data stream. In some embodiments, dataset generator 1307 may be configured to switch between synthetic data models at a predetermined time, or upon expiration of a time interval. For example, model optimizer 1303 may be configured to switch from an old model to a current model every hour, day, week, or the like. In various embodiments, system 1300 may detect when a data schema of the reference data stream changes and switch to a current data model configured to provide synthetic data with the current schema. Consistent with disclosed embodiments, switching between synthetic data models may include dataset generator 1307 retrieving a current model from model storage 1305 and computing resources 1304 providing a new synthetic data model for storage in model storage 1305. In some aspects, computing resources 1304 may update the current synthetic data model with the new synthetic data model and then dataset generator 1307 may retrieve the updated current synthetic data model. In various aspects, dataset generator 1307 may retrieve the current synthetic data model and then computing resources 1304 may update the current synthetic data model with the new synthetic data model. In some embodiments, model optimizer 1303 may provision computing resources 1304 with a synthetic data model for training using a new set of training data. In various embodiments, computing resources 1304 may be configured to continue updating the new synthetic data model. In this manner, a repeat of the switching process may include generation of a new synthetic data model and the replacement of a current synthetic data model by this new synthetic data model.

Figure 14:
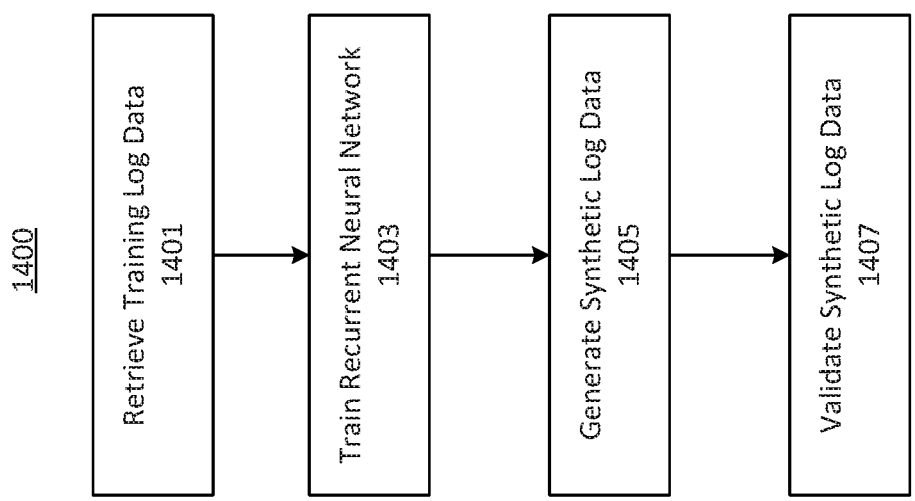
FIG. 14 depicts an exemplary process for generating synthetic JSON log data using the cloud computing system of FIG. 13, consistent with disclosed embodiments.

FIG. 14 depicts an exemplary process 1400 for generating synthetic JSON log data using the cloud computing system of FIG. 13. Process 1400 may include the steps of retrieving reference JSON log data, training a recurrent neural network to generate synthetic data resembling the reference JSON log data, generating the synthetic JSON log data using the recurrent neural network, and validating the synthetic JSON log data. In this manner system 1300 may use process 1400 to generate synthetic JSON log data that resembles actual JSON log data.

After starting, process 1400 may proceed to step 1401. In step 1401, substantially as described above with regard to FIG. 13, streaming data source 1301 may be configured to retrieve the JSON log data from a database, a file, a datasource, a topic in a distributed messaging system such Apache Kafka, or the like. The JSON log data may be retrieved in response to a request from model optimizer 1303. The JSON log data may be retrieved in real-time, or periodically (e.g., approximately every five minutes).

Process 1400 may then proceed to step 1403. In step 1403, substantially as described above with regard to FIG. 13, computing resources 1304 may be configured to train a recurrent neural network using the received data. The training of the recurrent neural network may proceed as described in "Training Recurrent Neural Networks," 2013, by Ilya Sutskever, which is incorporated herein by reference in its entirety.

Process 1400 may then proceed to step 1405. In step 1405, substantially as described above with regards to FIG. 13, dataset generator 1307 may be configured to generate synthetic JSON log data using the trained neural network. In some embodiments, dataset generator 1307 may be configured to generate the synthetic JSON log data at the same rate as actual JSON log data is received by streaming data source 1301. For example, dataset generator 1307 may be configured to generate batches of JSON log data at regular time intervals, the number of elements in a batch dependent on the number of elements received by streaming data source 1301. As an additional example, dataset generator 1307 may be configured to generate an element of synthetic JSON log data upon receipt of an element of actual JSON log data from streaming data source 1301.

Process 1400 may then proceed to step 1407. In step 1407, dataset generator 1307 (or another component of system 1300) may be configured to validate the synthetic data stream. For example, dataset generator 1307 may be configured to use a JSON validator (e.g., JSON SCHEMA VALIDATOR, JSONLINT, or the like) and a schema for the reference data stream to validate the synthetic data stream. In some embodiments, the schema describes key-value pairs present in the reference data stream. In some aspects, system 1300 may be configured to derive the schema from the reference data stream. In some embodiments, validating the synthetic data stream may include validating that keys present in the synthetic data stream are present in the schema. For example, when the schema includes the keys "first_name": "type": "string" and "last_name":{"type": "string"}, system 1300 may not validate the synthetic data stream when objects in the data stream lack the "first_name" and "last_name" keys. Furthermore, in some embodiments, validating the synthetic data stream may include validating that key-value formats present in the synthetic data stream match corresponding key-value formats in the reference data stream. For example, when the schema includes the keys "first_name": "type": "string" and "last_name":{"type": "string"}, system 1300 may not validate the synthetic data stream when objects in the data stream include a numeric-valued "first_name" or "last_name".

Figure 15:
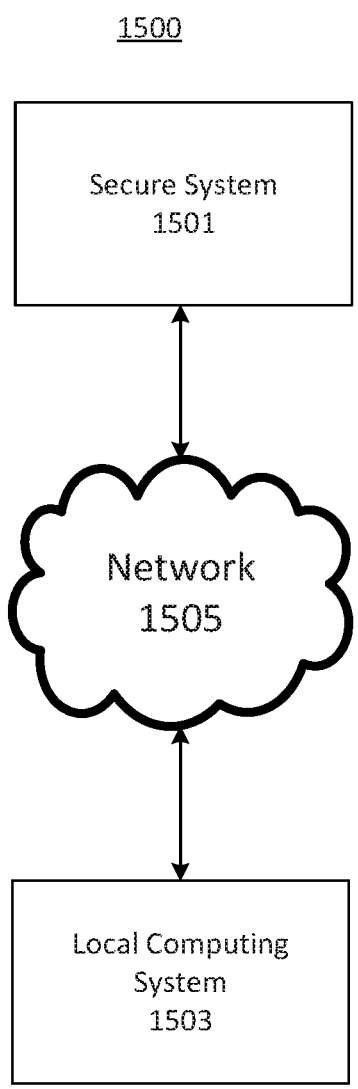
FIG. 15 depicts an exemplary system for secure generation and insecure use of models of sensitive data, consistent with disclosed embodiments.

FIG. 15 depicts an exemplary system 1500 for secure generation and insecure use of models of sensitive data. System 1500 may include a remote system 1501 and a local system 1503 that communicate using network 1505. Remote system 1501 may be substantially similar to system 100 and be implemented, in some embodiments, as described in FIG. 4. For example, remote system 1501 may include an interface, model optimizer, and computing resources that resemble interface 113, model optimizer 107, and computing resources 101, respectively, described above with regards to FIG. 1. For example, the interface, model optimizer, and computing resources may provide similar functionality to interface 113, model optimizer 107, and computing resources 101, respectively, and may be similarly implemented. In some embodiments, remote system 1501 may be implemented using a cloud computing infrastructure. Local system 1503 may comprise a computing device, such as a smartphone, tablet, laptop, desktop, workstation, server, or the like. Network 1505 may include any combination of electronics communications networks enabling communication between components of system 1500 (similar to network 115).

In various embodiments, remote system 1501 may be more secure than local system 1503. For example, remote system 1501 may better protected from physical theft or computer intrusion than local system 1503. As a non-limiting example, remote system 1501 may be implemented using AWS or a private cloud of an institution and managed at an institutional level, while the local system may be in the possession of, and managed by, an individual user. In some embodiments, remote system 1501 may be configured to comply with policies or regulations governing the storage, transmission, and disclosure of customer financial information, patient healthcare records, or similar sensitive information. In contrast, local system 1503 may not be configured to comply with such regulations.

System 1500 may be configured to perform a process of generating synthetic data. According to this process, system 1500 may train a synthetic data model on sensitive data using remote system 1501, in compliance with regulations governing the storage, transmission, and disclosure of sensitive information. System 1500 may then communicate the synthetic data model to local system 1503, which may be configured to use the system to generate synthetic data locally. In this manner, local system 1503 may be configured to use synthetic data resembling the sensitive information, which comply with policies or regulations governing the storage, transmission, and disclosure of such information.

According to this process, a model optimizer may receive a data model generation request from an interface. In response to the request, the model optimizer may provision computing resources with a synthetic data model. The computing resources may train the synthetic data model using a sensitive dataset (e.g., consumer financial information, patient healthcare information, or the like). The model optimizer may be configured to evaluate performance criteria of the synthetic data model (e.g., the similarity metric and prediction metrics described herein, or the like). Based on the evaluation of the performance criteria of the synthetic data model, the model optimizer may be configured to store the trained synthetic data model and metadata of the synthetic data model (e.g., values of the similarity metric and prediction metrics, of the data, the origin of the new synthetic data model, the data used to generate the new synthetic data model, when the new synthetic data model was generated, and the like). For example, the model optimizer may determine that the synthetic data model satisfied predetermined acceptability criteria based on one or more similarity and/or prediction metric values.

Local system 1503 may then retrieve the synthetic data model from remote system 1501. In some embodiments, local system 1503 may be configured to retrieve the synthetic data model in response to a synthetic data generation request received by local system 1503. For example, a user may interact with local system 1503 to request generation of synthetic data. In some embodiments, the synthetic data generation request may specify metadata criteria for selecting the synthetic data model. Local system 1503 may interact with remote system 1501 to select the synthetic data model based on the metadata criteria. Local system 1503 may then generate the synthetic data using the data model in response to the data generation request.

Figure 16:
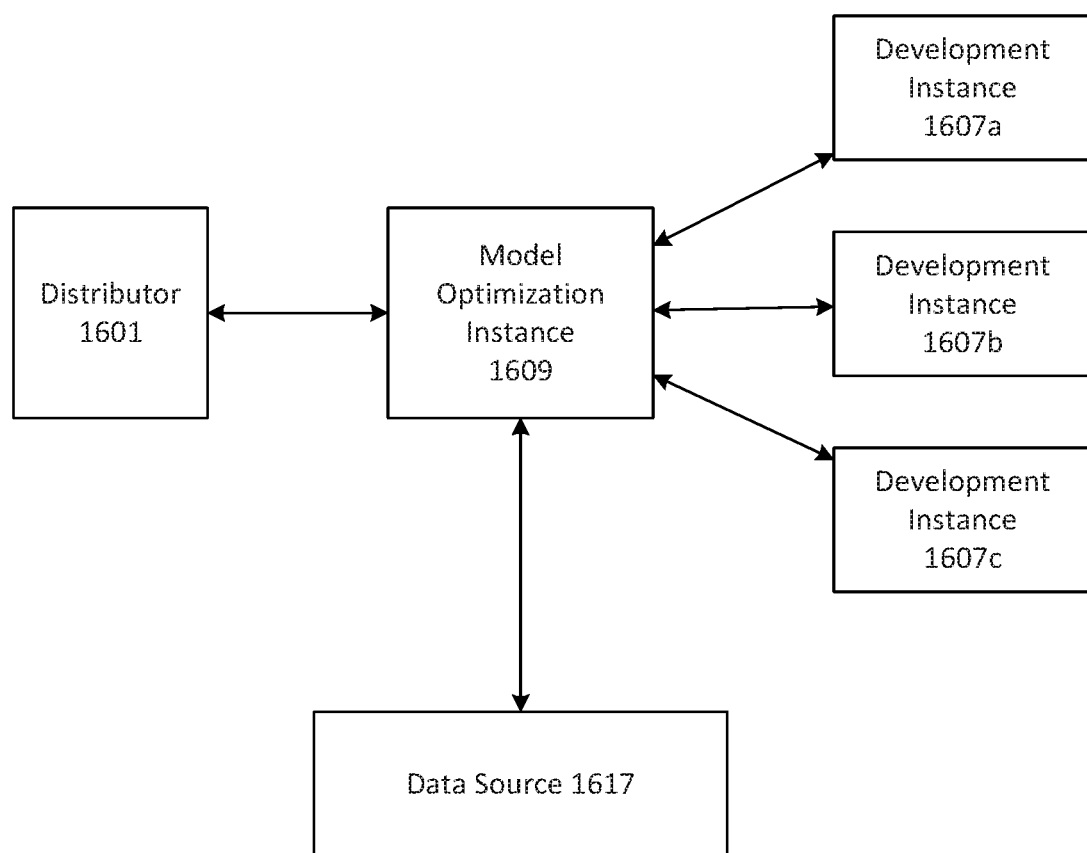
FIG. 16 depicts an exemplary system for hyperparameter tuning, consistent with disclosed embodiments.

FIG. 16 depicts an exemplary system 1600 for hyperparameter tuning, consistent with disclosed embodiments. In some embodiments, system 1600 may implement components of FIG. 1, similar to system 400 of FIG. 4. In this manner, system 1600 may implement hyperparameter tuning functionality in a stable and scalable fashion using a distributed computing environment, such as a public cloud-computing environment, a private cloud computing environment, a hybrid cloud computing environment, a computing cluster or grid, a cloud computing service, or the like. For example, as computing requirements increase for a component of system 1600 (e.g., as additional development instances are required to test additional hyperparameter combinations), additional physical or virtual machines may be recruited to that component. As in system 400, in some embodiments, dataset generator 103 and model optimizer 107 may be hosted by separate virtual computing instances of the cloud computing system.

In some embodiments, system 1600 may include a distributor 1601 with functionality resembling the functionality of distributor 401 of system 400. For example, distributor 1601 may be configured to provide, consistent with disclosed embodiments, an interface between the components of system 1600, and between the components of system 1600 and other systems. In some embodiments, distributor 1601 may be configured to implement interface 113 and a load balancer. In some aspects, distributor 1601 may be configured to route messages between elements of system 1600 (e.g., between data source 1617 and the various development instances, or between data source 1617 and model optimization instance 1609). In various aspects, distributor 1601 may be configured to route messages between model optimization instance 1609 and external systems. The messages may include data and instructions. For example, the messages may include model generation requests and trained models provided in response to model generation requests. Consistent with disclosed embodiments, distributor 401 may be implemented using one or more EC2 clusters or the like.

In some embodiments, system 1600 may include a development environment implementing one or more development instances (e.g., development instances 1607*a*, 1607*b*, and 1607*c*). The development environment may be configured to implement at least a portion of the functionality of computing resources 101, consistent with disclosed embodiments. In some aspects, the development instances (e.g., development instance 407) hosted by the development environment may train one or more individual models. In some aspects, system 1600 may be configured to spin up additional development instances to train additional data models, as needed. In some embodiments, system 1600 may comprise a serverless architecture and the development instance may be an ephemeral container instance or computing instance. System 1600 may be configured to receive a request for a task involving hyperparameter tuning; provision computing resources by spinning up (i.e., generating) development instances in response to the request; assign the requested task to the development instance; and terminate or assign a new task to the development instance when the development instance completes the requested task. Termination or assignment may be based on performance of the development instance or the performance of another development instance. In this way, the serverless architecture may more efficiently allocate resources during hyperparameter tuning traditional, server-based architectures.

In some aspects, a development instance may implement an application framework such as TENSORBOARD, JUPYTER and the like; as well as machine learning applications like TENSORFLOW, CUDNN, KERAS, and the like. Consistent with disclosed embodiments, these application frameworks and applications may enable the specification and training of models. In various aspects, the development instances may be implemented using EC2 clusters or the like.

Development instances may be configured to receive models and hyperparameters from model optimization source 1609, consistent with disclosed embodiments. In some embodiments, a development instance may be configured to train a received model according to received hyperparameters until a training criterion is satisfied. In some aspects, the development instance may be configured to use training data provided by data source 1617 to train the data. In various aspects, the data may be received from model optimization instance 1609, or another source. In some embodiments, the data may be actual data. In various embodiments, the data may be synthetic data.

Upon completion of training a model, a development instance may be configured to provide the trained model (or parameters describing the trained models, such as model weights, coefficients, offsets, or the like) to model optimization instance 1609. In some embodiments, a development instance may be configured to determine the performance of the model. As discussed herein, the performance of the model may be assessed according to a similarity metric and/or a prediction metric. In various embodiments, the similarity metric may depend on at least one of a statistical correlation score, a data similarity score, or a data quality score. In some embodiments, the development instance may be configured to wait for provisioning by model optimization instance 1609 with another model and another hyperparameter selection.

In some aspects, system 1600 may include model optimization instance 1609. Model optimization instance 1609 may be configured to manage training and provision of data models by system 1600. In some aspects, model optimization instance 1609 may be configured to provide the functionality of model optimizer 107. For example, model optimization instance 1609 may be configured to retrieve an at least partially initialized model from data source 1617. In some aspects, model optimization instance 1609 may be configured to retrieve this model from data source 1617 based on a model generation request received from a user or another system through distributor 1601. Model optimization instance 1609 may be configured to provision development instances with copies of the stored model according to stored hyperparameters of the model. Model optimization instance 1609 may be configured to receive trained models and performance metric values from the development instances. Model optimization instance 1609 may be configured to perform a search of the hyperparameter space and select new hyperparameters. This search may or may not depend on the values of the performance metric obtained for other trained models. In some aspects, model optimization instance 1609 may be configured to perform a grid search or a random search.

Consistent with disclosed embodiments, data source 1617 may be configured to provide data to other components of system 1600. In some embodiments, data source 1617 may include sources of actual data, such as streams of transaction data, human resources data, web log data, web security data, web protocols data, or system logs data. System 1600 may also be configured to implement model storage 109 using a database (not shown) accessible to at least one other component of system 1600 (e.g., distributor 1601, development instances 1607a-1607b, or model optimization instance 1609). In some aspects, the database may be an s3 bucket, relational database, or the like. In some aspects, data source 1617 may be indexed. The index may associate one or more model characteristics, such as model type, data schema, a data statistic, training dataset type, model task, hyperparameters, or training dataset with a model stored in memory.

As described herein, the model type may include neural network, recurrent neural network, generative adversarial network, kernel density estimator, random data generator, linear regression model, or the like. Consistent with disclosed embodiments, a data schema may include column variables when the input data is spreadsheet or relational database data, key-value pairs when the input data is JSON data, object or class definitions, or other data-structure descriptions.

Consistent with disclosed embodiments, training dataset type may indicate a type of log file (e.g., application event logs, error logs, or the like), spreadsheet data (e.g., sales information, supplier information, inventory information, or the like), account data (e.g., consumer checking or savings account data), or other data.

Consistent with disclosed embodiments, a model task may include an intended use for the model. For example, an application may be configured to use a machine learning model in a particular manner or context. This manner or context may be shared across a variety of applications. In some aspects, the model task may be independent of the data processed. For example, a model may be used for predicting the value of a first variable from the values of a set of other variables. As an additional example, a model may be used for classifying something (an account, a loan, a customer, or the like) based on characteristics of that thing. As a further example, a model may be used to determine a threshold value for a characteristic, beyond which the functioning or outcome of a system or process changes (e.g., a credit score below which a loan becomes unprofitable). For example, a model may be trained to determine categories of individuals based on credit score and other characteristics. Such a model may prove useful for other classification tasks performed on similar data.

Consistent with disclosed embodiments, hyperparameters may include training parameters such as learning rate, batch size, or the like, or architectural parameters such as number of layers in a neural network, the choice of activation function for a neural network node, the layers in a convolutional neural network or the like. Consistent with disclosed embodiments, a dataset identifier may include any label, code, path, filename, port, URL, URI or other identifier of a dataset used to train the model, or a dataset for use with the model.

As a nonlimiting example of the use of an index of model characteristics, system 1600 may train a classification model to identify loans likely to be nonperforming based using a dataset of loan application data with a particular schema. This classification model may be trained using an existing subset of the dataset of loan application data. An application may then use this classification model to identify likely nonperforming loans in new loan application data as that new data is added to the dataset. Another application may then become created that predicts the profitability of loans in the same dataset. A model request may also become submitted indicating one or more of the type of model (e.g., neural network), the data schema, the type of training dataset (loan application data), the model task (prediction), and an identifier of the dataset used to generate the data. In response to this request, system 1600 may be configured to use the index to identify the classification model among other potential models stored by data source 1617.

FIG. 17 depicts an exemplary process 1700 for hyperparameter tuning, consistent with disclosed embodiments. According to process 1700, model optimizer 107 may interact with computing resources 101 to generate a model through automated hyperparameter tuning. In some aspects, model optimizer 107 may be configured to interact with interface 113 to receive a model generation request. In some aspect, model optimizer 107 may be configured to interact with interface 113 to provide a trained model in response to the model generation request. The trained model may be generated through automated hyperparameter tuning by model optimizer 107. In various aspects, the computing resources may be configured to train the model using data retrieved directly from database 105, or indirectly from database 105 through dataset generator 103. The training data may be actual data or synthetic data. When the data is synthetic data, the synthetic data may be retrieved from database 105 or generated by dataset generator for training the model. Process 1700 may be implemented using system 1600, described above with regards to FIG. 16. According to this exemplary and non-limiting implementation, model optimization instance 1609 may implement the functionality of model optimizer 107, one or more development instances (e.g., development instance 1607a-1607c) may be implemented by computing resources 101, distributor 1601 may implement interface 113 and data source 1617 may implement or connect to database 105.

In step 1701, model optimizer 107 may receive a model generation request. The model generation request may be received through interface 113. The model generation request may have been provided by a user or another system. In some aspects, the model generation request may indicate model characteristics including at least one of a model type, a data schema, a data statistic, a training dataset type, a model task, or a training dataset identifier. For example, the request may be, or may include an API call. In some aspects, the API call may specify a model characteristic. As described herein, the data schema may include column variables, key-value pairs, or other data schemas. For example, the data schema may describe a spreadsheet or relational database that organizes data according to columns having specific semantics. As an additional example, the data schema may describe keys having particular constraints (such as formats, data types, and ranges) and particular semantics. The model task may comprise a classification task, a prediction task, a regression task, or another use of a model. For example, the model task may indicate that the requested model will be used to classify datapoints into categories or determine the dependence of an output variable on a set of potential explanatory variables.

In step 1703, model optimizer 107 may retrieve a stored model from model storage 109. In some aspects, the stored model may be, or may include, a recurrent neural network, a generative adversarial network, a random data model, a kernel density estimation function, a linear regression model, or any other kind of model. In various aspects, model optimizer 107 may also retrieve one or more stored hyperparameter values for the stored model. Retrieving the one or more stored hyperparameter values may be based on a hyperparameter search (e.g., random search or a grid search). Retrieving the stored hyperparameter value may include using an optimization technique. For example, the optimization technique may be one of a grid search, a random search, a Gaussian process, a Bayesian process, a Covariance Matrix Adaptation Evolution Strategy (CMA-ES), a derivative-based search, a stochastic hill-climb, a neighborhood search, an adaptive random search, or the like. In some embodiments, step 1703 may include provisioning resources to retrieve a stored model from model storage 109. For example, step 1703 may include generating (spinning up) an ephemeral container instance or computing instance to perform processes or subprocesses of step 1703. Alternatively, step 1703 may include providing commands to a running container instance, i.e., a warm container instance.

The stored hyperparameters may include training hyperparameters, which may affect how training of the model occurs, or architectural hyperparameters, which may affect the structure of the model. For example, when the stored model comprises a generative adversarial network, training parameters for the model may include a weight for a loss function penalty term that penalizes the generation of training data according to a similarity metric. As a further example, when the stored model comprises a neural network, the training parameters may include a learning rate for the neural network. As an additional example, when the model is a convolutional neural network, architectural hyperparameters may include the number and type of layers in the convolutional neural network.

In some embodiments, model optimizer 107 may be configured to retrieve the stored model (and optionally the stored one or more stored hyperparameters) based on the model generation request and an index of stored models. The index of stored models may be maintained by model optimizer 107, model storage 109, or another component of system 100. The index may be configured to permit identification of a potentially suitable model stored in model storage 109 based on a model type, a data schema, a data statistic, a training dataset type, a model task, a training dataset identifier and/or other modeling characteristic. For example, when a request includes a model type and data schema, model optimizer 107 may be configured to retrieve identifiers, descriptors, and/or records for models with matching or similar model types and data schemas. In some aspects, similarity may be determined using a hierarchy or ontology for model characteristics having categorical values. For example, a request for a model type may return models belonging to a genus encompassing the requested model type, or models belonging to a more specific type of model than the requested model type. In some aspects, similarity may be determined using a distance metric for model characteristics having numerical and/or categorical values. For example, differences between numerical values may be weighted and differences between categorical values may be assigned values. These values may be combined to generate an overall value. Stored models may be ranked and/or thresholded by this overall value.

In some embodiments, model optimizer 107 may be configured to select one or more of the matching or similar models. The selected model or models may then be trained, subject to hyperparameter tuning. In various embodiments, the most similar models (or the matching models) may be automatically selected. In some embodiments, model optimizer 107 may be configured to interact with interface 113 to provide an indication of at least some of the matching models to the requesting user or system. Model optimizer 107 may be configured to receive, in response, an indication of a model or models. Model optimizer 107 may be configured to then select this model or models.

In step 1705, model optimizer 107 may provision computing resources 101 associated with the stored model according to the one or more stored hyperparameter values. For example, model optimizer 107 may be configured to provision resources and provide commands to a development instance hosted by computing resources 101. The development instance may be an ephemeral container instance or computing instance. In some embodiments, provisioning resources to the development instance comprises generating the development instance, i.e., spinning up a development instance. Alternatively, provisioning resources comprises providing commands to a running development instance, i.e., a warm development instance. Provisioning resources to the development instance may comprise allocating memory, allocating processor time, or allocating other compute parameters. In some embodiments, step 1705 includes spinning up one or more development instances.

The one or more development instances may be configured to execute these commands to create an instance of the model according to values of any stored architectural hyperparameters associated with the model and train the model according to values of any stored training hyperparameters associated with the model. The one or more development instances may be configured to use training data indicated and/or provided by model optimizer 107. In some embodiments, the development instances may be configured to retrieve the indicated training data from dataset generator 103 and/or database 105. In this manner, the one or more development instances may be configured to generate a trained model. In some embodiments, the one or more development instances may be configured to terminate training of the model upon satisfaction of a training criterion, as described herein. In various embodiments, the one or more development instances may be configured to evaluate the performance of the trained model. The one or more development instances may evaluate the performance of the trained model according to a performance metric, as described herein. In some embodiments, the value of the performance metric may depend on a similarity between data generated by a trained model and the training data used to train the trained model. In various embodiments, the value of the performance metric may depend on an accuracy of classifications or predictions output by the trained model. As an additional example, in various embodiments, the one or more development instances may determine, for example, a univariate distribution of variable values or correlation coefficients between variable value. In such embodiments, a trained model and corresponding performance information may be provided to model optimizer 107. In various embodiments, the evaluation of model performance may be performed by model optimizer 107 or by another system or instance. For example, a development instance may be configured to evaluate the performance of models trained by other development instances.

In step 1707, model optimizer 107 may provision computing resources 101 with the stored model according to one or more new hyperparameter values. Model optimizer 107 may be configured to select the new hyperparameters from a space of potential hyperparameter values. In some embodiments, model optimizer 107 may be configured to search the hyperparameters space for the new hyperparameters according to a search strategy. The search strategy may include using an optimization technique. For example, the optimization technique may be one of a grid search, a random search, a Gaussian process, a Bayesian process, a Covariance Matrix Adaptation Evolution Strategy (CMA-ES), a derivative-based search, a stochastic hill-climb, a neighborhood search, an adaptive random search, or the like.

As described above, the search strategy may or may not depend on the values of the performance metric returned by the development instances. For example, in some embodiments model optimizer 107 may be configured to select new values of the hyperparameters near the values used for the trained models that returned the best values of the performance metric. In this manner, the one or more new hyperparameters may depend on the value of the performance metric associated with the trained model evaluated in step 1705. As an additional example, in various embodiments model optimizer 107 may be configured to perform a grid search or a random search. In a grid search, the hyperparameter space may be divided up into a grid of coordinate points. Each of these coordinate points may comprise a set of hyperparameters. For example, the potential range of a first hyperparameter may be represented by three values and the potential range of a second hyperparameter may be represented by two values. The coordinate points may then include six possible combinations of these two hyperparameters (e.g., where the "lines" of the grid intersect). In a random search, model optimizer 107 may be configured to select random coordinate points from the hyperparameter space and use the hyperparameters comprising these points to provision models. In some embodiments, model optimizer 107 may provision the computing resources with the new hyperparameters, without providing a new model. Instead, the computing resources may be configured to reset the model to the original state and retrain the model according to the new hyperparameters. Similarly, the computing resources may be configured to reuse or store the training data for the purpose of training multiple models.

At step 1707, model optimizer 107 may provision the computing resources by providing commands to one or more development instances hosted by computing resources 101, consistent with disclosed embodiments. In some embodiments, individual ones of the one or more development instances may perform a respective hyperparameter search. The one or more development instances of step 1707 may include a development instance that performed processes of step 1705, above. Alternatively or additionally, model optimizer 107 may spin up one or more new development instances at step 1707. At step 1707, model optimizer 107 may provide commands to one or more running (warm) development instances. The one or more development instances of step 1707 may be configured to execute these commands according to new hyperparameters to create and train an instance of the model. The development instance of step 1707 may be configured to use training data indicated and/or provided by model optimizer 107. In some embodiments, the one or more development instances may be configured to retrieve the indicated training data from dataset generator 103 and/or database 105. In this manner, the development instances may be configured to generate a second trained model. In some embodiments, the development instances may be configured to terminate training of the model upon satisfaction of a training criterion, as described herein. The development instances, model optimizer 107, and/or another system or instance may evaluate the performance of the trained model according to a performance metric.

In step 1709, model optimizer 107 may determine satisfaction of a termination condition. In some embodiments, the termination condition may depend on a value of the performance metric obtained by model optimizer 107. For example, the value of the performance metric may satisfy a predetermined threshold criterion. As an additional example, model optimizer 107 may track the obtained values of the performance metric and determine an improvement rate of these values. The termination criterion may depend on a value of the improvement rate. For example, model optimizer 107 may be configured to terminate searching for new models when the rate of improvement falls below a predetermined value. In some embodiments, the termination condition may depend on an elapsed time or number of models trained. For example, model optimizer 107 may be configured to train models to a predetermined number of minutes, hours, or days. As an additional example, model optimizer 107 may be configured to generate tens, hundreds, or thousands of models. Model optimizer 107 may then select the model with the best value of the performance metric. Once the termination condition is satisfied, model optimizer 107 may cease provisioning computing resources with new hyperparameters. In some embodiments, model optimizer 107 may be configured to provide instructions to computing resources still training models to terminate training of those models. In some embodiments, model optimizer 107 may terminate (spin down) one or more development instances once the termination criterion is satisfied.

In step 1711, model optimizer 107 may store the trained model corresponding to the best value of the performance metric in model storage 109. In some embodiments, model optimizer 107 may store in model storage 109 at least some of the one or more hyperparameters used to generate the trained model corresponding to the best value of the performance metric. In various embodiments, model optimizer 107 may store in model storage 109 model metadata, as described herein. In various embodiments, this model metadata may include the value of the performance metric associated with the model.

In step 1713, model optimizer 107 may update the model index to include the trained model. This updating may include creation of an entry in the index associating the model with the model characteristics for the model. In some embodiments, these model characteristics may include at least some of the one or more hyperparameter values used to generate the trained model. In some embodiments, step 1713 may occur before or during the storage of the model described in step 1711.

In step 1715 model optimizer 107 may provide the trained model corresponding to the best value of the performance metric in response to the model generation request. In some embodiments, model optimizer 107 may provide this model to the requesting user or system through interface 113. In various embodiments, model optimizer 107 may be configured to provide this model to the requesting user or system together with the value of the performance metric and/or the model characteristics of the model.

Classified data in disclosed embodiments may have a respective data schema (i.e., structure), including a data type, key value pair, label, metadata, field, relationship, view, index, package, procedure, function, trigger, sequence, synonym, link, directory, or queue. Classified data may be synthetic classified data. Classified data may be part of a classified dataset. Synthetic classified data may be part of a synthetic classified dataset. In some embodiments, classified data may be used as a reference dataset.

Figure 18:
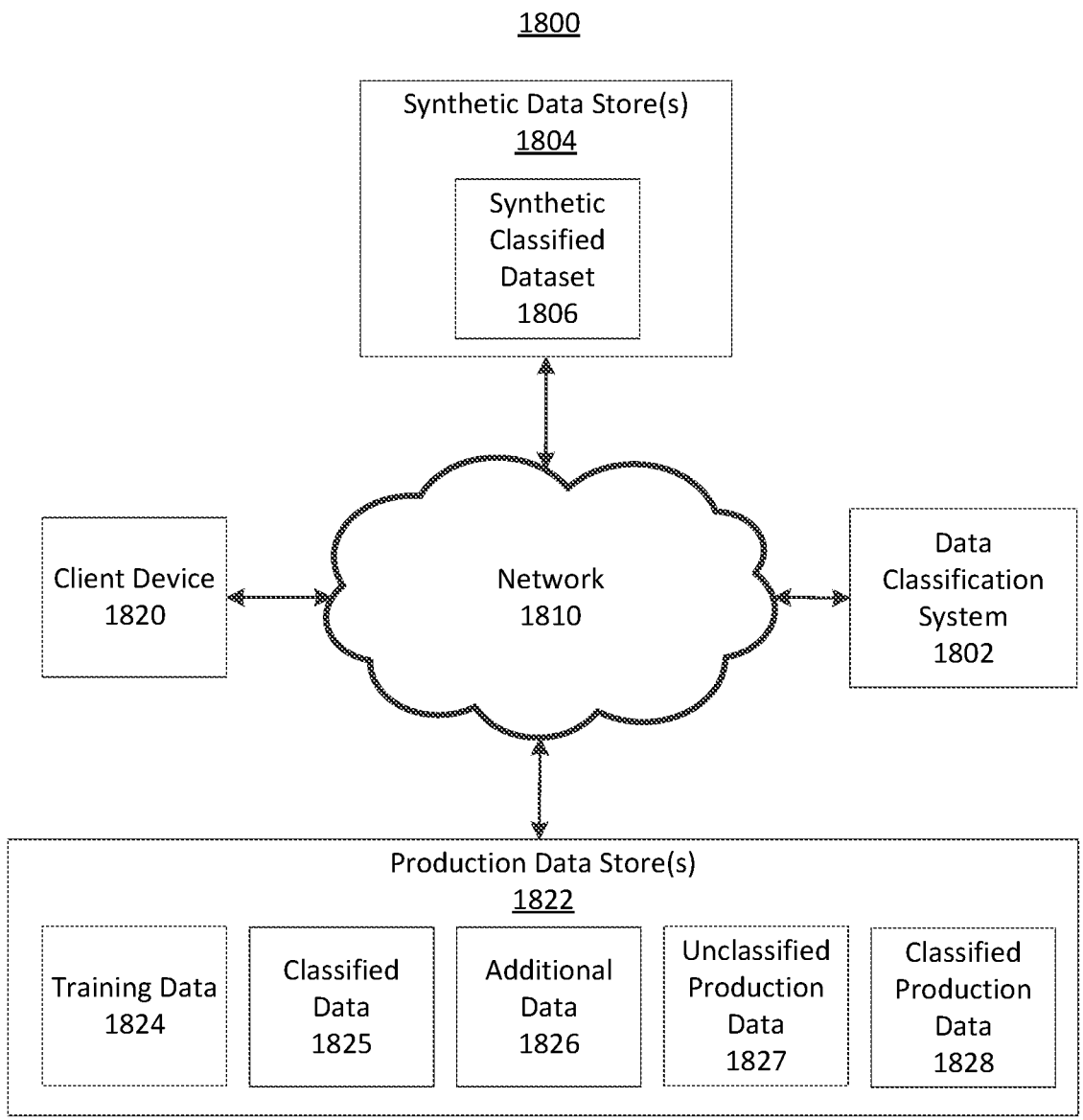
FIG. 18 depicts an exemplary system in communication with an exemplary network for data classification, consistent with disclosed embodiments.

FIG. 18 depicts an exemplary system 1800 in communication with an exemplary network 1810 for data classification, consistent with disclosed embodiments. In some embodiments, system 1800 may implement components of environment 100. System 1800 may comprise a data classification system 1802. System 1800 may comprise at least one synthetic data store 1804. At least one synthetic data store 1804 may comprise at least one synthetic classified dataset 1806. At least one synthetic data store 1804 may be a part of data classification system 1802. System 1800 may comprise at least one client device 1820. System 1800 may comprise at least one production data store 1822. In some embodiments, not depicted in FIG. 18, production data store 1822 may be a part of data classification system 1802. Consistent with the present embodiments, components of system 1800 may be included in a cloud computing system. For example, one or more components of system 1800 may be hosted by separate virtual computing instances of a cloud computing system.

Figure 22:
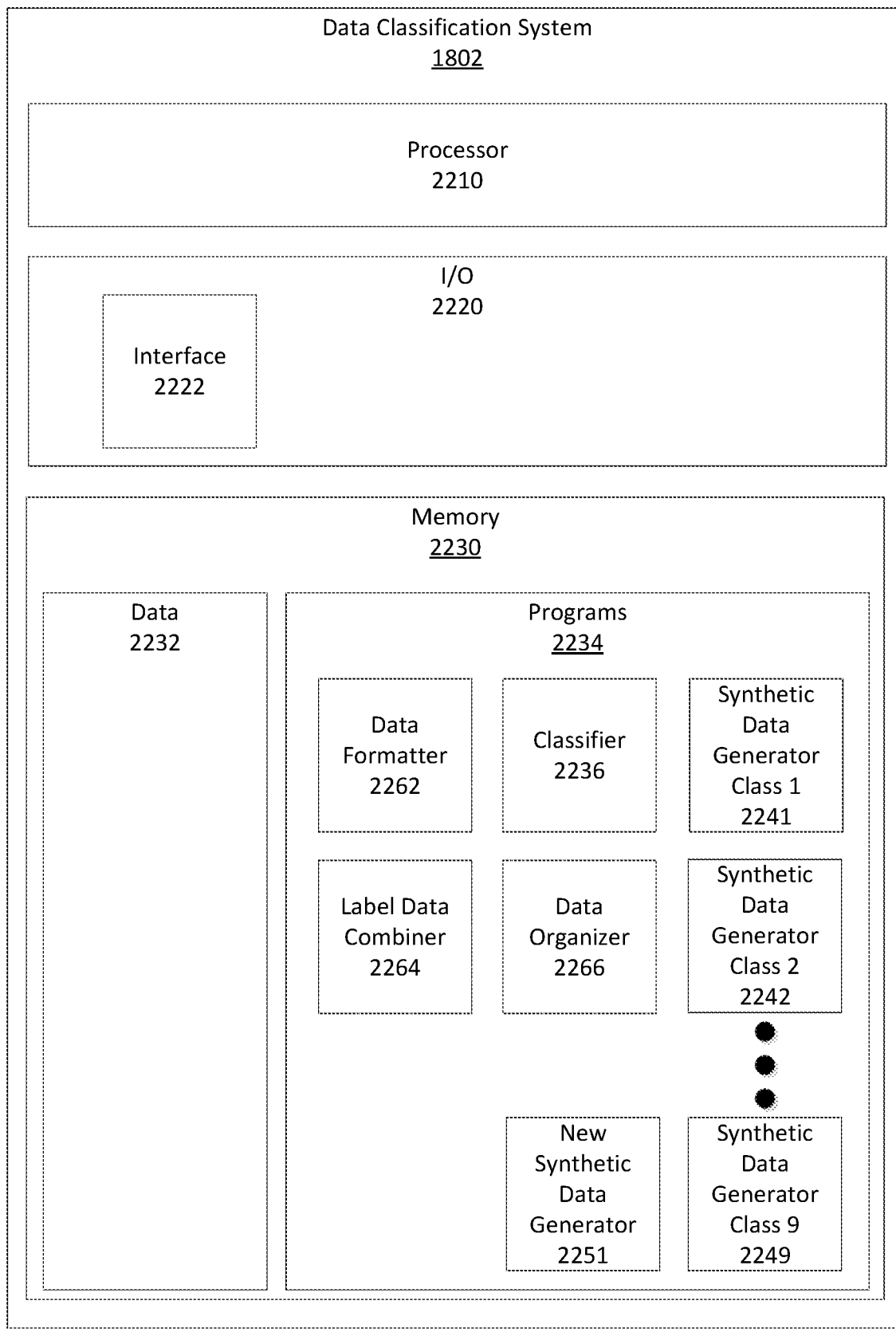
FIG. 22 depicts an exemplary system for data classification, consistent with disclosed embodiments.

In some embodiments, data classification system 1802 may comprise one or more of interface 113, model optimizer 107, database 105, dataset generator 103, computing resources 101, model storage 109, and/or model curator 111. Data classification system 1802 may be configured to communicate with synthetic data store 1804. Synthetic data store 1804 may include at least one memory, input/output device, processor, and/or other component, consistent with disclosed embodiments. A synthetic data store (e.g., synthetic data store 1804, synthetic data source 1309) may be configured to store a synthetic classified dataset 1806. A synthetic classified dataset 1806 may comprise synthetic data that has been classified. Synthetic data store 1804 may be configured to communicate synthetic classified dataset 1806 to data classification system 1802. Synthetic data store 1804 may be configured to communicate directly with data classification system 1802. Synthetic data store 1804 may be configured to communicate with data classification system 1802 via network 1810. Further details of data classification system 1802 are provided below (FIG. 22).

Production data store 1822 may include at least one memory, input/output device, processor, and/or other component, consistent with disclosed embodiments. In some embodiments, production data store may include one or more databases (e.g., a relational database, a cloud-based database, and/or any other database). In some embodiments, production data store 1822 may comprise training data 1824. Training data 1824 may comprise actual data and/or synthetic data. Training data 1824 may comprise at least one class. Production data store 1822 may comprise classified data 1825. Classified data 1825 may comprise actual data that has been classified (e.g., labeled). Classified data 1825 may comprise training data that has been classified (e.g., labeled). Production data store 1822 may comprise additional data 1826. Additional data 1826 may comprise actual data samples that have been classified. Additional data 1826 may comprise training data samples that have been classified. Production data store 1822 may comprise unclassified production data 1827. Unclassified production data 1827 may comprise actual data that has not been classified. Production data store 1822 may comprise classified production data 1828. Classified production data 1828 may comprise actual data that has been classified.

Client device 1820 may include at least one memory, processor, input/output device, and/or other component, consistent with disclosed embodiments. In some embodiments, client device 1820 may be included in local system 1503, may include local system 1503, or may be the same as local system 1503. In some embodiments, client device 1820 may be configured to communicate with production data store 1822.

Aspects of production data store 1822 and synthetic data store (e.g., synthetic data store 1804, synthetic data source 1309) may be stored in a same database (e.g., database 105) and/or provided as part of the same data source (e.g., data source 417). Training data 1824, classified data 1825, additional data 1826, unclassified production data 1827, and/or classified production data 1828 may be parts of a same dataset. Classified production data 1828 may comprise actual data that has been classified. Production data store 1822 may be configured to communicate data (e.g., training data 1824, classified data 1825, additional data 1826, unclassified production data 1827, classified production data 1828) to client device 1820 and/or data classification system 1802 via network 1810. Production data store 1822 may be configured to communicate data (e.g., training data 1824, classified data 1825, additional data 1826, unclassified production data 1827, classified production data 1828) directly to client device 1820 and/or data classification system 1802. Client device 1820 may be configured to communicate data (e.g., training data 1824, classified data 1825, additional data 1826, unclassified production data 1827, classified production data 1828) to data classification system 1802 via network 1810. Client device 1820 may be configured to communicate data (e.g., training data 1824, classified data 1825, additional data 1826, unclassified production data 1827, classified production data 1828) directly to data classification system 1802. Production data store 1822 and/or client device 1820 may be configured to communicate data (e.g., training data 1824, classified data 1825, additional data 1826, unclassified production data 1827, classified production data 1828) to data classification system 1802 over a secure connection.

In some embodiments, data classification system 1802 may be configured to communicate with client device 1820 via network 1810. Data classification system 1802 may be configured to communicate directly with client device 1820. Data classification system 1802 may be configured to communicate with client device 1820 over a secure connection.

In some embodiments, data classification system 1802 may be configured to receive training data 1824 from production data store 1822. In other embodiments, data classification system 1802 may be configured to retrieve training data 1824 from production data store 1822. Data classification system 1802 may be configured to generate classified data 1825 by using a trained data classification model to classify unclassified data. Classified data 1825 may comprise at least one class. Data classification system 1802 may be configured to communicate classified data 1825 to production data store 1822. Data classification system 1802 may be configured to train at least one synthetic data generator to generate (i.e., create) synthetic data corresponding to the at least one class. Synthetic data may be generated in a plurality of formats. For example, synthetic data may be generated in a structured data format (e.g., CSV, TSV), a semi-structured data format (e.g., JSON, Parquet, Avro), an unstructured data formats (e.g., raw text), and/or any other data format. Training a synthetic data generator may employ (i.e., use) classified data 1825.

Labeled samples in disclosed embodiments may comprise data samples that have been labeled. The labels may be embedded in a data structure of the data samples. The labels may be provided separately from the data structure. The labels may correspond to an additional class.

In some embodiments, data classification system 1802 may be configured to receive additional data 1826 from production data store 1822. In other embodiments, data classification system 1802 may be configured to retrieve additional data 1826 from production data store 1822. Additional data 1826 may comprise labeled samples of an additional class. The additional class may not be contained in classified data 1825. Data classification system 1802 may be configured to create a synthetic data generator. The synthetic data generator may comprise a new synthetic data generator or data model. Data classification system 1802 may be configured to train, using additional data 1826, a synthetic data generator to generate synthetic data corresponding to the additional class. Synthetic data may be generated in a plurality of data formats. Data classification system 1802 may be configured to generate synthetic classified dataset 1806. Synthetic classified dataset 1806 may comprise synthetic data corresponding to at least one class. Synthetic classified dataset 1806 may comprise synthetic data corresponding to the additional class. Synthetic classified dataset 1806 may comprise the at least one class and the additional class. The at least one class and the additional class may be distinct. Data classification system 1802 may be configured to communicate synthetic classified dataset 1806 to synthetic data store 1804. Data classification system 1802 may be configured to retrain a trained data classification model using synthetic classified dataset 1806 to generate a retrained data classification model. The retrained data classification model may be configured to identify the additional class.

In some embodiments, data classification system 1802 may be configured to receive unclassified production data 1827 from production data store 1822. In other embodiments, data classification system 1802 may be configured to retrieve unclassified production data 1827 from production data store 1822. Data classification system 1802 may be configured to classify unclassified production data 1827. Classified production data 1828 may comprise at least one class and an additional class. Data classification system 1802 may be configured to communicate classified production data 1828 to production data store 1822.

In some embodiments, additional data 1826 may comprise labeled samples of an additional class. The additional class may not be identified in classified data 1825. However, classified data 1825 may comprise data corresponding to the additional class. Trained data classification models used to generate the classified data 1825 may not be enabled to recognize data corresponding to the additional class prior to retraining.

In some embodiments, a synthetic data generator may be trained using classified data 1825. A synthetic data generator may be trained using synthetic data. Synthetic data may be generated to resemble classified data 1825. A synthetic data generator may be trained using additional data 1826. A synthetic data generator may be trained using any combination of classified data 1825, synthetic data, and additional data 1826.

In some embodiments, a data classification model may be trained using classified data 1825. A data classification model may be trained using a synthetic classified dataset 1806.

In some embodiments, data classification system 1802 may be configured to receive a request to add a new label to a trained data classification model. Data classification system 1802 may be configured to automatically find one or more appropriate data sources, from a plurality of data sources, given a request to add a new label. Data classification system 1802 may be configured to generate synthetic data using one or more appropriate data sources from a plurality of data sources. Data classification system 1802 may be configured to retrain the trained data classification model using the synthetic data.

Network 1810 may be a public network or private network and may include, for example, a wired or wireless network, including, without limitation, a Local Area Network, a Wide Area Network, a Metropolitan Area Network, an IEEE standard compliant wireless network (e.g., "Wi Fi"), a network of networks (e.g., the Internet), a land line telephone network, or any other network. Network 1810 may be connected to other networks (not depicted in FIG. 18) to connect the various system components to each other and/or to external systems or devices. In some embodiments, network 1810 may be a secure network and require a password to access the network. In some embodiments, network 1810 may include, may be a component of or may be the same as network 115.

Figure 19:
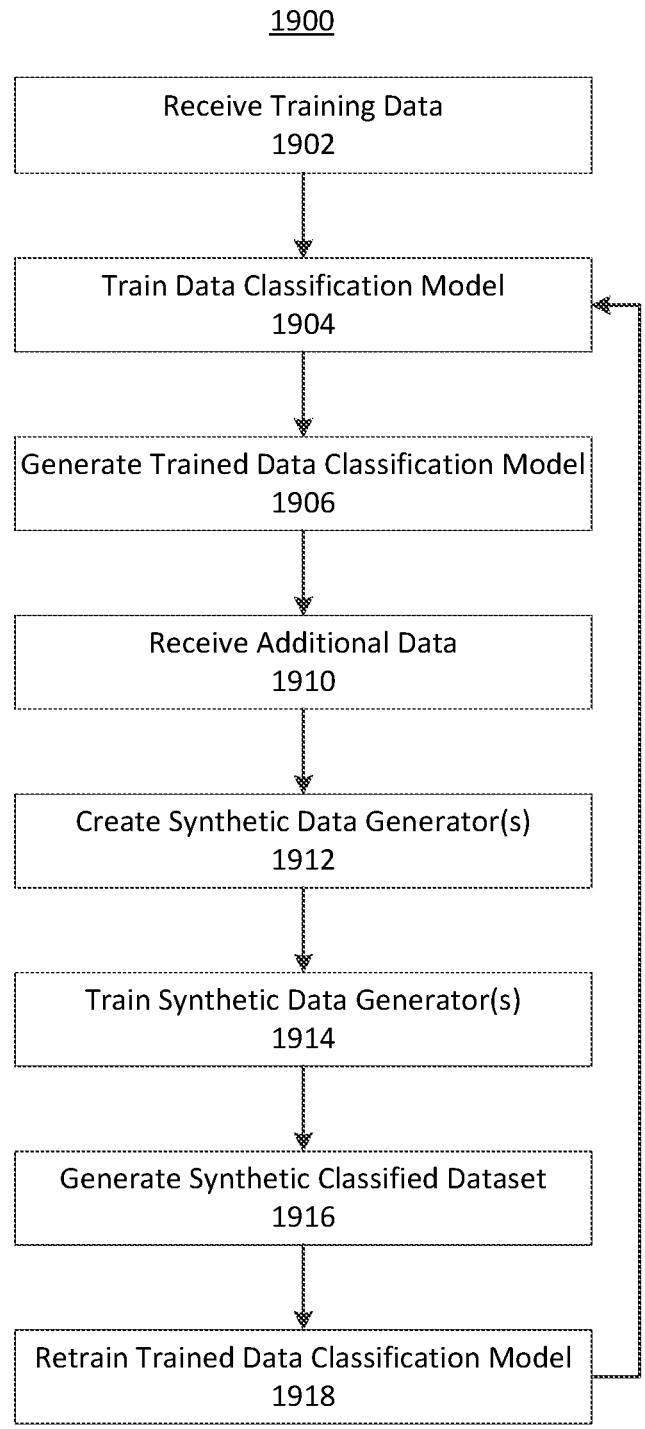
FIG. 19 depicts an exemplary process for data classification, consistent with disclosed embodiments.

FIG. 19 depicts an exemplary process 1900 for data classification, consistent with disclosed embodiments. Process 1900 may be implemented by using one or more aspects of system 1800 and/or one or more aspects of system 1600 to automatically perform one or more operations of the process. In some embodiments, data classification system 1802 may perform process 1900 using programs. One or more of model optimizer 107, dataset generator 103, and/or other components of environment 100 may perform operations of process 1900, consistent with disclosed embodiments. It should be noted that other components of system 1800, including, for example, client device 1820 may perform one or more operations of process 1900. It should be noted that other components of system 1600, including, for example, a development instance (e.g., development instances 1607a-c), and/or model optimization instance 1609 may perform one or more operations of process 1900.

At step 1902, data classification system 1802 may receive training data 1824, consistent with disclosed embodiments. In some embodiments, training data 1824 may be received from a client device 1820 and/or a production data store 1822. In other embodiments, data classification system 1802 may retrieve training data 1824. Training data 1824 may comprise actual data and/or synthetic data. Training data 1824 may comprise at least one class. Step 1902 may include receiving a request for classifying data from client device 1820.

At step 1904, data classification system 1802 may train a data classification model, consistent with disclosed embodiments. A data classification model may be trained to identify at least one class. Training a data classification model may include using any of the data models described herein and/or any other data model. Training a data classification model may include passing training data 1824 as input to the data classification model. Training a data classification model may include identifying a data classification model and retrieving the data classification model from a model storage.

At step 1906, data classification system 1802 may generate a trained data classification model, consistent with disclosed embodiments. The trained data classification model may be configured to identify at least one class. Classified data 1825 may be generated by using a trained data classification model to classify unclassified data. Classified data 1825 may comprise at least one class. In some embodiments, classified data 1825 may be communicated to a client device 1820 and/or a production data store 1822. Classified data 1825 may comprise data that has been classified.

Data classification system 1802 may create a synthetic data generator (e.g., dataset generator 103), consistent with disclosed embodiments. A synthetic data generator may be created for each of at least one class.

Data classification system 1802 may train at least one synthetic data generator (e.g., dataset generator 103), consistent with disclosed embodiments. A synthetic data generator may be trained to generate synthetic data corresponding to a class. In some embodiments, synthetic data may be communicated to a synthetic data store 1804. Synthetic data may be stored as part of a synthetic classified dataset 1806.

At step 1910, data classification system 1802 may receive additional data 1826, consistent with disclosed embodiments. Additional data 1826 may comprise at least one additional class of labeled samples. Additional data 1826 may comprise any number of samples including, for example, at least 500 samples. The at least one additional class may not be contained in training data 1824. The at least one additional class may not be contained in classified data 1825. In some embodiments, additional data 1826 may be received from a client device 1820 and/or a production data store 1822. In other embodiments, data classification system 1802 may retrieve additional data 1826.

In some embodiments, data classification system 1802 may retrieve additional data 1826 from a database (e.g., production data store 1822). Additional data 1826 may include categorical data. Data classification system 1802 may generate a normalized training dataset by normalizing categorical data. Normalizing categorical data may comprise converting categorical data to numerical values within a predetermined range. Data classification system 1802 may train a generative network by using a normalized training dataset. In some embodiments, additional data 1826 may include at least one of missing values or not-a-number values. Normalizing categorical data may comprise converting at least one of missing values or not-a-number values to corresponding predetermined numerical values outside a predetermined range.

At step 1912, data classification system 1802 may create (i.e., generate) at least one synthetic data generator, consistent with disclosed embodiments. A synthetic data generator may resemble a new synthetic data model.

At step 1914, data classification system 1802 may train a synthetic data generator, consistent with disclosed embodiments. A synthetic data generator may be trained using additional data 1826. A synthetic data generator may be trained to generate synthetic data corresponding to an additional class. Data classification system 1802 may evaluate performance criteria of a synthetic data generator. Data classification system 1802 may store a synthetic data generator, and metadata of the synthetic data generator, based on an evaluation of performance criteria of the synthetic data generator.

At step 1916, data classification system 1802 may generate a synthetic classified dataset 1806, consistent with disclosed embodiments. A synthetic classified dataset 1806 may comprise at least one additional class. A synthetic classified dataset 1806 may be generated by employing one or more synthetic data generators and/or one or more new synthetic data generators. In some embodiments, a synthetic classified dataset 1806 may be stored in at least one synthetic data store 1804.

In some embodiments, data classification system 1802 may train a generative network to generate synthetic classified dataset 1806 with a synthetic data schema matching a schema of classified data 1825 and/or additional data 1826. Data classification system 1802 may train a generative adversarial network using a loss function that penalizes generation of synthetic classified dataset 1806 differing from classified data 1825 and/or additional data 1826 by less than a predetermined amount.

In some embodiments, data classification system 1802 may generate synthetic classified dataset 1806 using a generative network of a generative adversarial network. A generative network may be configured to generate synthetic classified dataset 1806 differing at least a predetermined amount from classified data 1825 and/or additional data 1826 according to a similarity metric. A similarity metric may be based on a covariance of synthetic classified dataset 1806, and a covariance of classified data 1825 and/or additional data 1826. A similarity metric may be based on a univariate value distribution of an element of synthetic classified dataset 1806, and a univariate value distribution of an element of classified data 1825 and/or additional data 1826. A similarity metric may be based on a multivariate value distribution of an element of synthetic classified dataset 1806, and a multivariate value distribution of an element of classified data 1825 and/or additional data 1826. A similarity metric may be based on a number of rows of synthetic classified dataset 1806 that match rows of classified data 1825 and/or additional data 1826.

At step 1918, data classification system 1802 may retrain a trained data classification model, consistent with disclosed embodiments. A trained data classification model may be retrained to identify at least one additional class using a synthetic classified dataset 1806. In some embodiments, at least some of the components configured to train a data classification model at step 1904 may also be configured to retrain the trained data classification model at step 1918. As shown in FIG. 19, steps 1904, 1906, 1910, 1912, 1914, 1916, and 1918, may be repeated.

In some embodiments, data classification system 1802 may generate a statistical correlation score between synthetic classified dataset 1806, and classified data 1825 and/or additional data 1826. Data classification system 1802 may retrain a trained data classification model using synthetic classified dataset 1802. Data classification system 1802 may retrain a trained data classification model by determining that synthetic classified dataset 1806 satisfies a criterion concerning a statistical correlation score between synthetic classified dataset 1806, and classified data 1825 and/or additional data 1826. Data classification system 1802 may generate a data similarity score between synthetic classified dataset 1806, and classified data 1825 and/or additional data 1826. Data classification system 1802 may retrain a trained data classification model by determining that synthetic classified dataset 1806 satisfies a criterion concerning a data similarity score between synthetic classified dataset 1806, and classified data 1825 and/or additional data 1826. Data classification system 1802 may generate a data quality score for synthetic classified dataset 1806. Data classification system 1802 may retrain a trained data classification model by determining that synthetic classified dataset 1806 satisfies a criterion concerning a data quality score for synthetic classified dataset 1806.

Figure 20:
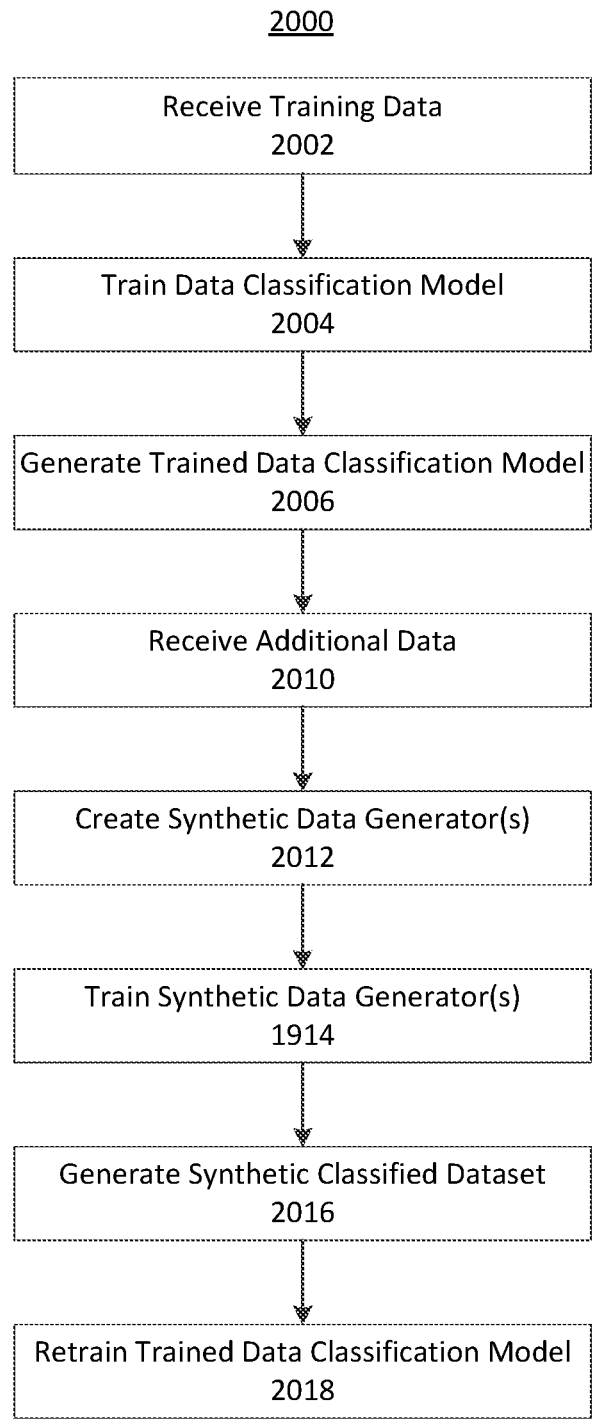
FIG. 20 depicts an exemplary process for data classification, consistent with disclosed embodiments.

FIG. 20 depicts an exemplary process 2000 for data classification, consistent with disclosed embodiments. Process 2000 may be implemented by using one or more aspects of system 1800 and/or one or more aspects of system 1600 to automatically perform one or more operations of the process. In some embodiments, data classification system 1802 may perform process 2000 using programs. One or more of model optimizer 107, dataset generator 103, and/or other components of environment 100 may perform operations of process 2000, consistent with disclosed embodiments. It should be noted that other components of system 1800, including, for example, client device 1820 may perform one or more operations of process 2000. It should be noted that other components of system 1600, including, for example, a development instance (e.g., development instances 1607a-c), and/or model optimization instance 1609 may perform one or more operations of process 2000.

At step 2002, data classification system 1802 may receive training data 1824, consistent with disclosed embodiments. In some embodiments, training data 1824 may be received from a client device 1820 and/or a production data store 1822. In other embodiments, data classification system 1802 may retrieve training data 1824. Training data 1824 may comprise actual data and/or synthetic data. Training data 1824 may comprise at least one class. Step 2002 may include receiving a request for classifying data from client device 1820.

At step 2004, data classification system 1802 may train a data classification model, consistent with disclosed embodiments. A data classification model may be trained to identify at least one class. Training a data classification model may include using any of the data models described herein and/or any other data model. Training a data classification model may include passing training data 1824 as input to the data classification model. Training a data classification model may include identifying a data classification model and retrieving the data classification model from a model storage.

At step 2006, data classification system 1802 may generate a trained data classification model, consistent with disclosed embodiments. The trained data classification model may be configured to identify at least one class. Classified data 1825 may be generated by using a trained data classification model to classify unclassified data. Classified data 1825 may comprise at least one class. In some embodiments, classified data 1825 may be communicated to a client device 1820 and/or a production data store 1822. Classified data 1825 may comprise data that has been classified.

At step 2010, data classification system 1802 may receive additional data 1826, consistent with disclosed embodiments. Additional data 1826 may comprise at least one additional class of labeled samples. Additional data 1826 may comprise any number of samples including, for example, at least 500 samples. The at least one additional class may not be contained in training data 1824. The at least one additional class may not be contained in classified data 1825. In some embodiments, additional data 1826 may be received from a client device 1820 and/or a production data store 1822. In other embodiments, data classification system 1802 may retrieve additional data 1826.

At step 2012, data classification system 1802 may create (i.e., generate) at least one synthetic data generator, consistent with disclosed embodiments. A synthetic data generator may resemble a new synthetic data model.

At step 2014, data classification system 1802 may train a synthetic data generator, consistent with disclosed embodiments. A synthetic data generator may be trained using additional data 1826. A synthetic data generator may be trained to generate synthetic data corresponding to an additional class. Data classification system 1802 may evaluate performance criteria of a synthetic data generator. Data classification system 1802 may store a synthetic data generator, and metadata of the synthetic data generator, based on an evaluation of performance criteria of the synthetic data generator.

At step 2016, data classification system 1802 may generate a synthetic classified dataset 1806, consistent with disclosed embodiments. A synthetic classified dataset 1806 may comprise at least one additional class. A synthetic classified dataset 1806 may be generated by employing one or more synthetic data generators and/or one or more new synthetic data generators. In some embodiments, a synthetic classified dataset 1806 may be stored in at least one synthetic data store 1804.

At step 2018, data classification system 1802 may retrain a trained data classification model, consistent with disclosed embodiments. A trained data classification model may be retrained to identify at least one additional class using a synthetic classified dataset 1806.

Figure 21:
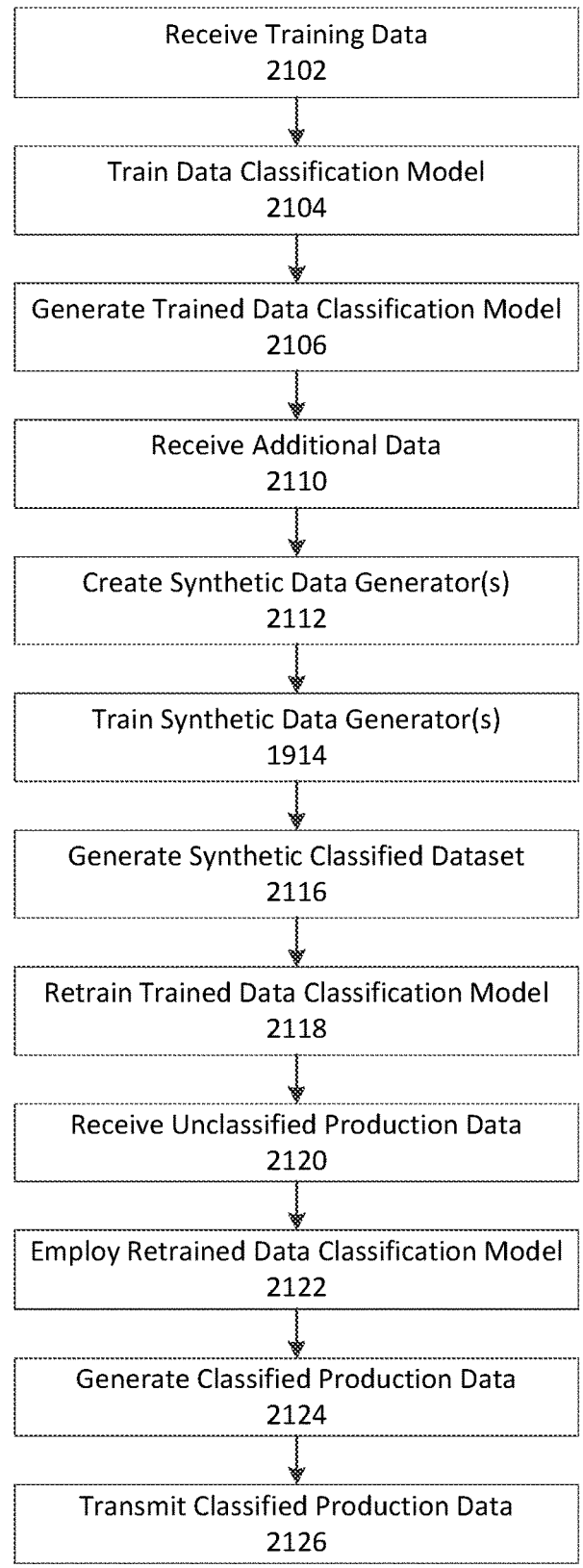
FIG. 21 depicts an exemplary process for data classification, consistent with disclosed embodiments.

FIG. 21 depicts an exemplary process 2100 for data classification, consistent with disclosed embodiments. Process 2100 may be implemented by using one or more aspects of system 1800 and/or one or more aspects of system 1600 to automatically perform one or more operations of the process. In some embodiments, data classification system 1802 may perform process 2100 using programs. One or more of model optimizer 107, dataset generator 103, and/or other components of environment 100 may perform operations of process 2100, consistent with disclosed embodiments. It should be noted that other components of system 1800, including, for example, client device 1820 may perform one or more operations of process 2100. It should be noted that other components of system 1600, including, for example, a development instance (e.g., development instances 1607a-c), and/or model optimization instance 1609 may perform one or more operations of process 2100.

At step 2102, data classification system 1802 may receive training data 1824, consistent with disclosed embodiments. In some embodiments, training data 1824 may be received from a client device 1820 and/or a production data store 1822. In other embodiments, data classification system 1802 may retrieve training data 1824. Training data 1824 may comprise actual data and/or synthetic data. Training data 1824 may comprise at least one class. Step 2102 may include receiving a request for classifying data from client device 1820.

At step 2104, data classification system 1802 may train a data classification model, consistent with disclosed embodiments. A data classification model may be trained to identify at least one class. Training a data classification model may include using any of the data models described herein and/or any other data model. Training a data classification model may include passing training data 1824 as input to the data classification model. Training a data classification model may include identifying a data classification model and retrieving the data classification model from a model storage.

At step 2106, data classification system 1802 may generate a trained data classification model, consistent with disclosed embodiments. The trained data classification model may be configured to identify at least one class. Classified data 1825 may be generated by using a trained data classification model to classify unclassified data. Classified data 1825 may comprise at least one class. In some embodiments, classified data 1825 may be communicated to a client device 1820 and/or a production data store 1822. Classified data 1825 may comprise data that has been classified.

At step 2110, data classification system 1802 may receive additional data 1826, consistent with disclosed embodiments. Additional data 1826 may comprise at least one additional class of labeled samples. Additional data 1826 may comprise any number of samples including, for example, at least 500 samples. The at least one additional class may not be contained in training data 1824. The at least one additional class may not be contained in classified data 1825. In some embodiments, additional data 1826 may be received from a client device 1820 and/or a production data store 1822. In other embodiments, data classification system 1802 may retrieve additional data 1826.

At step 2112, data classification system 1802 may create (i.e., generate) at least one synthetic data generator, consistent with disclosed embodiments. A synthetic data generator may resemble a new synthetic data model.

At step 2114, data classification system 1802 may train a synthetic data generator, consistent with disclosed embodiments. A synthetic data generator may be trained using additional data 1826. A synthetic data generator may be trained to generate synthetic data corresponding to an additional class.

At step 2116, data classification system 1802 may generate a synthetic classified dataset 1806, consistent with disclosed embodiments. A synthetic classified dataset 1806 may comprise at least one additional class. A synthetic classified dataset 1806 may be generated by employing one or more synthetic data generators and/or one or more new synthetic data generators. In some embodiments, a synthetic classified dataset 1806 may be stored in at least one synthetic data store 1804.

At step 2118, data classification system 1802 may retrain a trained data classification model, consistent with disclosed embodiments. A trained data classification model may be retrained to identify at least one additional class using a synthetic classified dataset 1806.

At step 2120, data classification system 1802 may receive unclassified production data 1827, consistent with disclosed embodiments. In some embodiments, unclassified production data 1827 may be received from a client device 1820 and/or a production data store 1822. In other embodiments, data classification system 1802 may retrieve unclassified production data 1827. Unclassified production data 1827 may comprise data that has not been classified. Step 2102 may include receiving a request for classifying production data from client device 1820.

At step 2122, data classification system 1802 may employ (i.e., use) a retrained data classification model, consistent with disclosed embodiments. Employing a retrained data classification model may include using any of the data models described herein that have been retrained and/or any other data model. Employing a retrained data classification model may include passing unclassified production data 1827 as input to the retrained data classification model. Employing a retrained data classification model may include identifying a retrained data classification model and retrieving the retrained data classification model from a model storage. A retrained data classification model may be employed on unclassified production data 1827. A retrained data classification model may be previously trained to identify one or more classes. A retrained data classification model may be previously retrained to identify one or more additional classes.

At step 2124, data classification system 1802 may generate classified production data 1828, consistent with disclosed embodiments. Classified production data 1828 may be generated by using a retrained data classification model to classify unclassified production data 1827. Classified production data 1828 may comprise at least one class. Classified production data 1828 may comprise at least one additional class. Classified production data 1828 may comprise data that has been classified.

At step 2126, data classification system 1802 may communicate classified production data 1828, consistent with disclosed embodiments. In some embodiments, classified production data 1828 may be communicated to a client device 1820 and/or a production data store 1822.

FIG. 22 depicts an exemplary data classification system 1802, consistent with disclosed embodiments. As shown, data classification system 1802 may comprise at least one processor 2210, input/output device 2220, and/or memory 2230. As will be appreciated by one skilled in the art, the components and arrangement of components included in data classification system 1802 may vary. For example, as compared to the depiction in FIG. 22, data classification system 1802 may include a larger or smaller number of processors, input/output devices, or memories. In addition, data classification system 1802 may further include other components or devices not depicted that perform or assist in the performance of one or more processes consistent with the disclosed embodiments. The components and arrangements shown in FIG. 22 are not intended to limit the disclosed embodiments, as the components used to implement the disclosed processes and features may vary.

Processor 2210 may comprise known computing processors. In some embodiments, processor 2210 may include a microprocessor. Processor 2210 may comprise a single core or multiple core processor that executes parallel processes simultaneously. For example, processor 2210 may be a single core processor configured with virtual processing technologies. In some embodiments, processor 2210 may use logical processors to simultaneously execute and control multiple processes. Processor 2210 may implement virtual machine technologies, or other known technologies to provide the ability to execute, control, run, manipulate, store, etc., multiple software processes, applications, programs, etc. In another embodiment, processor 2210 may include a multiple core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 2210 may execute various instructions stored in memory 2230 to perform various functions of the disclosed embodiments described in greater detail below. Processor 2210 may be configured to execute functions written in one or more known programming languages.

An input/output device 2220 may comprise an interface 2222. In data classification system 1802, an input/output device 2220 may include at least one of a display, an LED, a router, a touchscreen, a keyboard, a microphone, a speaker, a haptic device, a camera, a button, a dial, a switch, a knob, a transceiver, an input device, an output device, or any other input/output device to perform methods of the disclosed embodiments. Input/output device may comprise an interface 2222 (e.g., a user interface). In some embodiments, interface 2222 may include, may be the same as, or may be included in interface 113.

Memory 2230 may include a volatile or nonvolatile, magnetic, semiconductor, optical, removable, non-removable, or other type of storage device or tangible (i.e., non-transitory) computer readable medium, consistent with disclosed embodiments. Memory 2230 may comprise data 2232, programs 2234, and/or other components.

Data 2232 may comprise training data. Data 2232 may comprise training data. Data 2232 may comprise actual data. Data 2232 may comprise synthetic data. Data 2232 may comprise additional data. Data 2232 may comprise at least one synthetic classified dataset. Data 2232 may include at least one of encrypted data or unencrypted data. Consistent with disclosed embodiments, data 2232 may comprise datasets, classified data, unclassified data, model data (e.g., model parameters, training criteria, performance metrics, etc.), and/or any other data.

Programs 2234 may comprise instructions configured to cause at least one processor 2210 to perform operations. Programs 2234 may include one or more programs (e.g., modules, code, scripts, or functions) used to perform methods consistent with disclosed embodiments. Programs 2234 may include operating systems (not shown) that perform known operating system functions when executed by one or more processors. Disclosed embodiments may operate and function with computer systems running any type of operating system. Programs 2234 may be written in one or more programming or scripting languages. One or more of such software sections or modules of memory 2230 may be integrated into a computer system, non-transitory computer readable media, or existing communications software. In some embodiments, programs 2234 may be implemented or replicated as firmware or circuit logic.

One or more programs 2234 may comprise at least one data formatter 2262. At least one data formatter 2262 may comprise data formatting instructions. One or more programs 2234 may comprise at least one classifier 2236. At least one classifier 2236 may comprise at least one data classification model, at least one trained data classification model, and/or at least one retrained data classification model. One or more programs 2234 may comprise at least one synthetic data generator (2241, 2242 . . . 2249). A plurality of synthetic data generators (2241, 2242 . . . 2249) may correspond to a plurality of classes. For example, synthetic data generator 2241 may correspond to class 1. Synthetic data generator 2242 may correspond to class 2, and so on. One or more programs 2234 may comprise at least one label data combiner 2264. At least one label data combiner 2264 may comprise instructions configured to combine label data with background data. One or more programs 2234 may comprise at least one data organizer 2266. At least one data organizer 2266 may comprise at least one organizational model. One or more programs 2234 may comprise at least one new synthetic data generator 2251. At least one new synthetic data generator 2251 may correspond to an additional class.

In some embodiments, a trained data classification model may be retrained using one or more libraries comprising data formatting instructions 2262.

In some embodiments, a trained data classification model may be retrained using one or more functions 2264 configured to combine label data with background data. Background data may comprise any combination of known adverbs, adjectives, nouns, stop words, verbs, and any other word types.

In some embodiments, a trained data classification model may be retrained using at least one data organizer 2266 trained to organize additional data. At least one data organizer 2266 may comprise at least one organizational model. An organizational model may be based on a data schema.

Example: Generating Financial Data

As described above, the disclosed systems and methods can enable generation of synthetic data similar to an actual dataset (e.g., using a synthetic data generator). Synthetic data can be generated using a data model trained on an actual dataset (e.g., as described above with regards to FIG. 9). Such data models can include generative adversarial networks. The following code depicts the creation of a synthetic dataset based on sensitive financial records using a generative adversarial network.

```
# The following step defines a Generative Adversarial Network data model.
model_options = {'GANhDim', 'GANZDim', 'num_epochs'}
# The following step defines the delimiters present in the actual data
data_options = {'delimiter':','}
data = Data(input_file_path='bank_records.csv', options=data_options)
# In these steps the GAN model is trained to generate data statistically similar to
the actual data.
SDG = SyntheticDataGenerator('GAN', model_options)
SDG.train(data)
# The GAN model can now be used to generate synthetic data.
generated_data = SDG.generate(num_output_samples)
# The synthetic data can be saved to a file for later use in training other machine
learning models for this prediction task without relying on the original data.
SyntheticDataGenerator.save_as_csv(generated_data, output_file_path =
"bank_records_GAN.csv')
SDG.save_model_into_file('bank_data_model')
```

Example: Scrubbing Sensitive Data

As described above with regard to at least FIGS. 5A and 5B, the disclosed systems and methods can enable identification and removal of sensitive data portions in a dataset. In this example, sensitive portions of a dataset are automatically detected and replaced with synthetic data. In this example, the dataset includes human resources records. The sensitive portions of the dataset are replaced with random values (though they could also be replaced with synthetic data that is statistically similar to the original data as described in FIGS. 5A and 5B). In particular, this example depicts tokenizing four columns of the dataset. In this example, the Business Unit and Active Status columns are tokenized such that all the characters in the values can be replaced by random chars of the same type while preserving format. For the column of Employee number, the first three characters of the values can be preserved but the remainder of each employee number can be tokenized. Finally, the values of the Last Day of Work column can be replaced with fully random values. All of these replacements can be consistent across the columns.

```
input_data = Data('hr_data.csv')
keys_for_formatted_scrub = {'Business Unit':None, 'Active Status': None, 'Company': (0,3)}
keys_to_randomize = ['Last Day of Work']
tokenized_data, scrub_map = input_data.tokenize(
keys_for_formatted_scrub=keys_for_formatted_scrub, keys_to_randomize=keys_to_randomize)
tokenized_data.save_data_into_file('hr_data_tokenized.csv')
```

Alternatively, the system can use the scrub map to tokenize another file in a consistent way (e.g., replace the same values with the same replacements across both files) by passing the returned scrub map dictionary to a new application of the scrub function.

```
input_data_2 = Data('hr_data_part2.csv')
keys_for_formatted_scrub = {'Business Unit':None, 'Company': (0,3)}
keys_to_randomize = ['Last Day of Work']
# to tokenize the second file, we pass the scrub_map diction to tokenize function.
tokenized_data_2, scrub_map = input_data_2.tokenize(
keys_for_formatted_scrub=keys_for_formatted_scrub, keys_to_randomize=keys_to_randomize,
scrub_map = scrub_map)
tokenized_data_2.save_data_into_file('hr_data_tokenized_2.csv')
```

In this manner, the disclosed systems and methods can be used to consistently tokenize sensitive portions of a file.

Example: Retraining a Trained Data Classification Model by Combining Label Data with Background Data As described above, the disclosed systems and methods can enable classification of unclassified data. For example, unclassified data may comprise text. Classified data may be generated by using a trained data classification model on unclassified data. The classified data may comprise one or more classes. For example, classes may comprise customer identification information, customer bank account numbers, and/or bank account types. The trained data classification model may comprise label data for the one or more classes. One or more synthetic data generators may be trained to generate synthetic data corresponding to the one or more classes. The label data may be combined with additional label data. The additional label data may correspond to an additional class. The additional class may be part of additional data. For example, an additional class may comprise customer credit card numbers. Additional data may comprise samples of customer credit card numbers. The label data may be combined with background data. A trained data classification model may be retrained using the combination of label data, the additional label data, and/or the background data.

```
background_token_breakdown = {
    'ADJ': dict(file='../structured/background/adverbs.csv', file_count=0,
        dist=7.312311997568415),
    'ADV': dict(file='../structured/background/adjectives.csv', file_count=0,
        dist=4.911994773488732),
    'NOUN': dict(file='../structured/background/cleaned_nouns.csv', file_count=0,
        dist=24.06763021734042),
    'STOP': dict(file='../structured/background/stop_words.csv', file_count=0,
        dist=34.85787802245024),
    'VERB': dict(file='../structured/background/verbs.csv', file_count=0,
        dist=15.961646630542251)
}
```

Systems and methods disclosed herein involve unconventional improvements over conventional approaches to synthetic data generation. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer-readable media, or existing communications software. The programs, modules, or code may also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An automated system for classifying data, the system comprising:
   at least one memory storing instructions; and
      at least one processor configured to execute the instructions to perform operations comprising:
      receiving training data comprising a class;
      training a data classification model using the training data to generate a trained data classification model, the trained data classification model configured to identify the class;
      receiving additional data comprising labeled samples of an additional class, the additional class not contained in the training data;
      creating a synthetic data generator;
      training the synthetic data generator to generate synthetic data corresponding to the additional class;
      generating a synthetic classified dataset comprising the additional class; and
      retraining the trained data classification model using the synthetic classified dataset to generate a retrained data classification model, the retrained data classification model configured to identify the additional class.

2. The system of claim 1, wherein the synthetic classified dataset is generated using a generative network of a generative adversarial network.

3. The system of claim 2, wherein the generative network is trained to generate the synthetic classified dataset with less than a predetermined proportion of duplicate elements.

4. The system of claim 3, wherein the generative network is trained to generate the synthetic classified dataset with a synthetic data schema matching a schema of the additional data.

5. The system of claim 2, the operations further comprising: training the generative adversarial network using a loss function that penalizes generation of the synthetic classified dataset differing from the additional data by less than a predetermined amount.

6. The system of claim 2, wherein the generative network is configured to generate the synthetic classified dataset differing at least a predetermined amount from the additional data according to a similarity metric.

7. The system of claim 6, wherein the similarity metric is based on a covariance of the synthetic classified dataset and a covariance of the additional data.

8. The system of claim 6, wherein the similarity metric is based on a univariate value distribution of an element of the synthetic classified dataset and a univariate value distribution of an element of the additional data.

9. The system of claim 6, wherein the similarity metric is based on a multivariate value distribution of an element of the synthetic classified dataset and a multivariate value distribution of an element of the additional data.

10. The system of claim 6, wherein the similarity metric is based on a number of rows of the synthetic classified dataset that match rows of the additional data.

11. The system of claim 1, the operations further comprising:
   generating at least one of a statistical correlation score between the synthetic classified dataset and the additional data, a data similarity score between the synthetic classified dataset and the additional data, and a data quality score for the synthetic classified dataset; and
   wherein retraining the trained data classification model using the synthetic classified dataset comprises determining that the synthetic classified dataset satisfies a criterion concerning the at least one of the statistical correlation score between the synthetic classified dataset and the additional data, the data similarity score between the synthetic classified dataset and the additional data, and the data quality score for the synthetic classified dataset.

12. The system of claim 2, the operations further comprising:
   retrieving the additional data from a database, the additional data including categorical data;
   generating a normalized training dataset by normalizing the categorical data; and
   training the generative network using the normalized training dataset.

13. The system of claim 12, wherein normalizing the categorical data comprises converting the categorical data to numerical values within a predetermined range.

14. The system of claim 13, wherein:
   the additional data includes at least one of missing values or not-a-number values; and
   generating the normalized training dataset by normalizing the categorical data comprises converting the at least one of the missing values or the not-a-number values to corresponding predetermined numerical values outside the predetermined range.

15. The system of claim 1, wherein the training of the synthetic data generator comprises:
- evaluating performance criteria of the synthetic data generator; and
- storing the synthetic data generator and metadata of the synthetic data generator based on the evaluation of the performance criteria of the synthetic data generator.

16. The system of claim 1, wherein the trained data classification model is retrained using one or more libraries comprising data formatting instructions.

17. The system of claim 1, wherein the trained data classification model is retrained using one or more functions configured to combine label data with background data.

18. The system of claim 1, wherein the trained data classification model is retrained using an organizational model trained to organize the additional data.

19. A method for classifying data, the method comprising:
- receiving training data comprising a class;
- training a data classification model using the training data to generate a trained data classification model, the trained data classification model configured to identify the class;
- receiving additional data comprising labeled samples of an additional class, the additional class not contained in the training data;
- creating a synthetic data generator;
- training the synthetic data generator to generate synthetic data corresponding to the additional class;
- generating a synthetic classified dataset comprising the additional class; and
- retraining the trained data classification model using the synthetic classified dataset to generate a retrained data classification model, the retrained data classification model configured to identify the additional class.

20. An automated system for classifying data, the system comprising:
- at least one memory storing instructions; and
- at least one processor configured to execute the instructions to perform operations comprising:
  - receiving training data comprising a class;
  - training a data classification model using the training data to generate a trained data classification model, the trained data classification model configured to identify the class;
  - receiving additional data comprising labeled samples of an additional class, the additional class not contained in the training data;
  - creating a synthetic data generator;
  - training the synthetic data generator to generate synthetic data corresponding to the additional class;
  - generating a synthetic classified dataset comprising the additional class;
  - retraining the trained data classification model using the synthetic classified dataset to generate a retrained data classification model, the retrained data classification model configured to identify the additional class;
  - receiving, at a server, from a client device, unclassified production data;
  - generating classified production data by using the retrained data classification model to classify the unclassified production data, the classified production data comprising the additional class; and
  - communicating, to the client device, the classified production data.

* * * * *